(12) United States Patent
Sagara et al.

(10) Patent No.: US 12,744,472 B2
(45) Date of Patent: Sep. 22, 2026

(54) POWER CONDITIONING SYSTEM

(71) Applicant: TMEIC Corporation, Tokyo (JP)

(72) Inventors: Mitsuhiko Sagara, Tokyo (JP); Issei Fukasawa, Tokyo (JP)

(73) Assignee: TMEIC CORPORATION, Tokyo (JP)

( * ) Notice: Subject to any disclaimer, the term of this patent is extended or adjusted under 35 U.S.C. 154(b) by 59 days.

(21) Appl. No.: 18/838,672

(22) PCT Filed: Feb. 6, 2023

(86) PCT No.: PCT/JP2023/003801
§ 371 (c)(1),
(2) Date: Aug. 15, 2024

(87) PCT Pub. No.: WO2024/166170
PCT Pub. Date: Aug. 15, 2024

(65) Prior Publication Data

US 2025/0175094 A1 May 29, 2025

(51) Int. Cl.
*H02M 1/12* (2006.01)
*H02M 1/32* (2007.01)
(Continued)

(52) U.S. Cl.
CPC ............. *H02M 7/483* (2013.01); *H02M 1/12* (2013.01); *H02M 1/32* (2013.01); *H02M 1/36* (2013.01)

(58) Field of Classification Search
CPC .......... H02M 7/483; H02M 1/12; H02M 1/32; H02M 1/36
See application file for complete search history.

(56) References Cited

U.S. PATENT DOCUMENTS 4,330,777 A 5/1982 McDUFF
8,902,616 B2 12/2014 Royak et al.
(Continued)

FOREIGN PATENT DOCUMENTS

CN 102187562 B 9/2014
EP 2660962 A2 11/2013
(Continued)

OTHER PUBLICATIONS

Japanese Notice of Reasons for Refusal issued Oct. 28, 2025 in Japanese Patent Application No. 2024-575881, 8 pgs.
(Continued)

*Primary Examiner* — Adolf D Berhane
(74) *Attorney, Agent, or Firm* — XSENSUS LLP

(57) ABSTRACT

A power conditioning system having a controller which includes voltage recognition circuitry that recognizes a voltage value of a voltage to be generated by a circuit component, a voltage calculation circuitry that calculates a voltage calculation value on the basis of the voltage value recognized by the voltage recognition circuitry, failure determination circuitry that compares the voltage calculation value calculated by the voltage calculation circuitry with a predetermined threshold and determines that a failure occurs in an AC capacitor in a case where the voltage calculation value is smaller than the predetermined threshold, and operation control circuitry that stops a power conditioner in a case where the failure determination circuitry determines that a failure occurs in the AC capacitor during operation of the power conditioner.

10 Claims, 13 Drawing Sheets

(51) Int. Cl.

| | |
|---|---|
| ***H02M 1/36*** | (2007.01) |
| ***H02M 7/483*** | (2007.01) |

(56) References Cited

U.S. PATENT DOCUMENTS

| | | | | |
|---|---|---|---|---|
| 9,488,686 | B2 * | 11/2016 | Bhandarkar | H02M 5/4585 |
| 2015/0241503 | A1 * | 8/2015 | Bhandarkar | G01R 31/64 363/44 |
| 2019/0131865 | A1 | 5/2019 | Burguete Archel et al. | |
| 2024/0380303 | A1 * | 11/2024 | Terashima | G01R 31/2843 |

FOREIGN PATENT DOCUMENTS

| | | | |
|---|---|---|---|
| JP | 11-174105 | A | 7/1999 |
| JP | 2017-212838 | A | 11/2017 |
| WO | WO 2022/239122 | A1 | 11/2022 |
| WO | WO 2022/269929 | A1 | 12/2022 |

OTHER PUBLICATIONS

International Search Report & Written Opinion issued Mar. 7, 2023 in PCT/JP2023/003801, filed on Feb. 6, 2023, 12 pages (with English Translation).

Office Action dated Aug. 13, 2026 in the corresponding Indian patent application No. 202417059431.

* cited by examiner

FIG.1

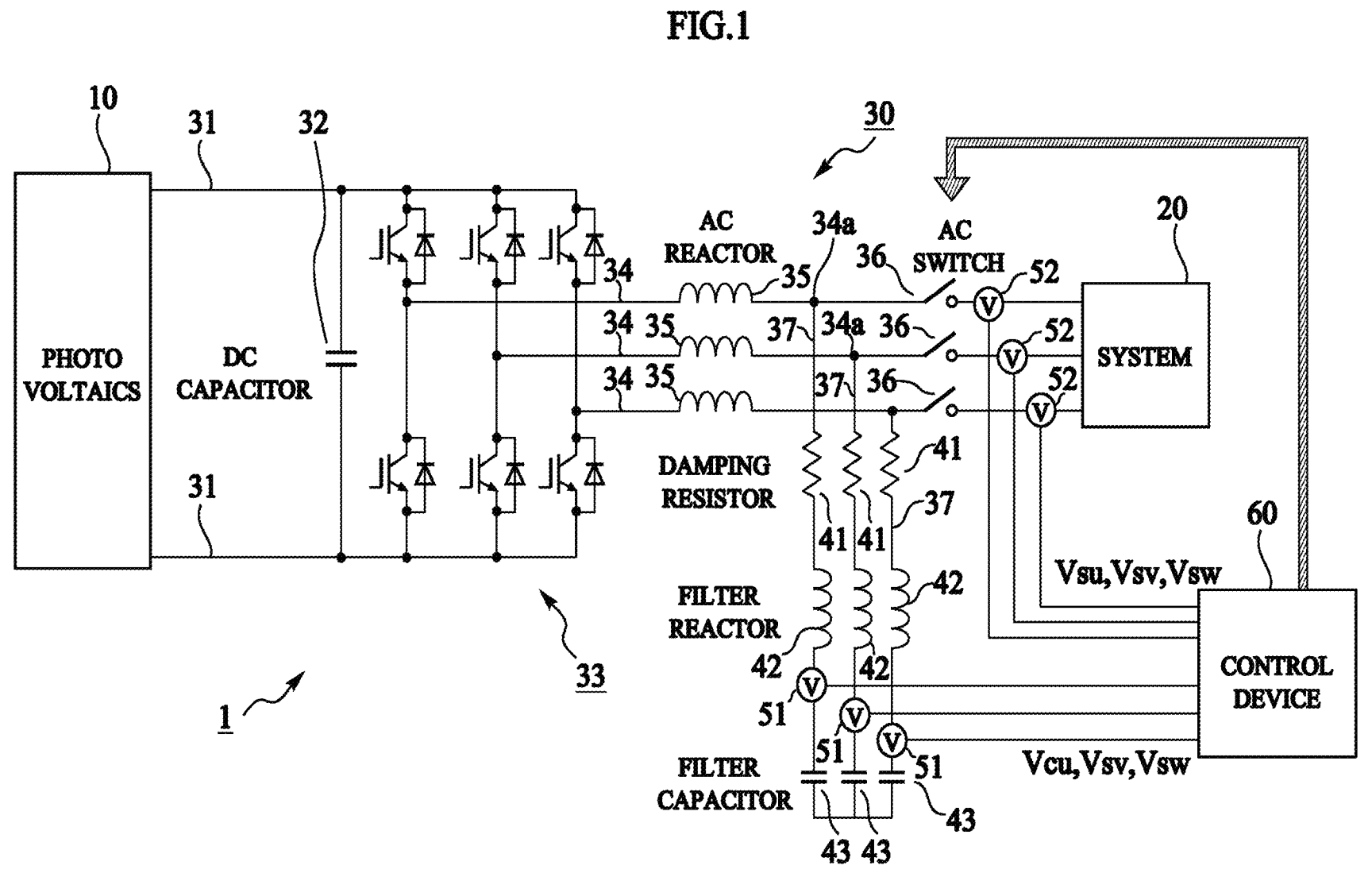

PHOTO VOLTAICS
DC CAPACITOR
AC REACTOR
DAMPING RESISTOR
FILTER REACTOR
FILTER CAPACITOR
AC SWITCH
SYSTEM
CONTROL DEVICE
$V_{su}, V_{sv}, V_{sw}$
$V_{cu}, V_{sv}, V_{sw}$ 30A
1A
10
PHOTO VOLTAICS
31
31
DC CAPACITOR
32
33
34
34
34
35
35
35
AC REACTOR
34a
34a
37
37
37
DAMPING RESISTOR
41
41
41
FILTER REACTOR
42
42
42
FILTER CAPACITOR
43
43
43
51
51
51
Vcu, Vsv, Vsw
53
53
53
36
36
36
AC SWITCH
20
SYSTEM
Vs2u, Vs2v, Vs2w
60A
CONTROL DEVICE

61AU
60A
U-PHASE DETERMINATION UNIT
62AU
63aU
63bU
MEAN VALUE
63cU
EFFECTIVE VALUE
64U
71
72
ISSUANCE OF ALARM OF FAILURE OR STOPPING OF CONDITIONER
Vs2u +
VAu
VAu 2
LPF
<VAu 2>
√<VAu 2>
Vcu
FAILURE DETERMINATION LEVEL
63U
DURING OPERATION
73
61AV
V-PHASE DETERMINATION UNIT
STORAGE UNIT
61AW
W-PHASE DETERMINATION UNIT 30B
20
SYSTEM
60B
CONTROL DEVICE
AC SWITCH
36
54
V
34a
37
41
42
43
Vru, Vrv, Vrw
AC REACTOR
35
DAMPING RESISTOR
FILTER REACTOR
FILTER CAPACITOR
34
33
32
DC CAPACITOR
31
1B
10
PHOTO VOLTAICS

60B
ISSUANCE OF ALARM OF FAILURE OR STOPPING OF CONDITIONER
72
71
DURING OPERATION
73
STORAGE UNIT
61BU
64U
EFFECTIVE VALUE
√<VAU2>
63cU
MEAN VALUE
<VAU2>
63bU
LPF
FAILURE DETERMINATION LEVEL
63U
63aU
VAU2
VAU
62BU
+
-
VrU
VcU
U-PHASE DETERMINATION UNIT
61BV
V-PHASE DETERMINATION UNIT
61BW
W-PHASE DETERMINATION UNIT

10
PHOTO VOLTAICS
31
31
32
DC CAPACITOR
33
1C
30C
34
34
34
AC REACTOR
35
35
35
34a
34a
37
37
37
36
36
36
AC SWITCH
20
SYSTEM
DAMPING RESISTOR
41
41
41
FILTER REACTOR
42
42
42
55
55
55
V
V
V
60C
CONTROL DEVICE
FILTER CAPACITOR
Vlu, Vlv, Vlw
43
43
43

60C
61CU
U-PHASE DETERMINATION UNIT
62CU
63aU
63bU
MEAN VALUE
63cU
EFFECTIVE VALUE
64U
Vlu
Vcu
LPF
63U
FAILURE DETERMINATION LEVEL
71
72
ISSUANCE OF ALARM OF FAILURE OR STOPPING OF CONDITIONER
DURING OPERATION
73
STORAGE UNIT
61CV
V-PHASE DETERMINATION UNIT
61CW
W-PHASE DETERMINATION UNIT

FIG.11

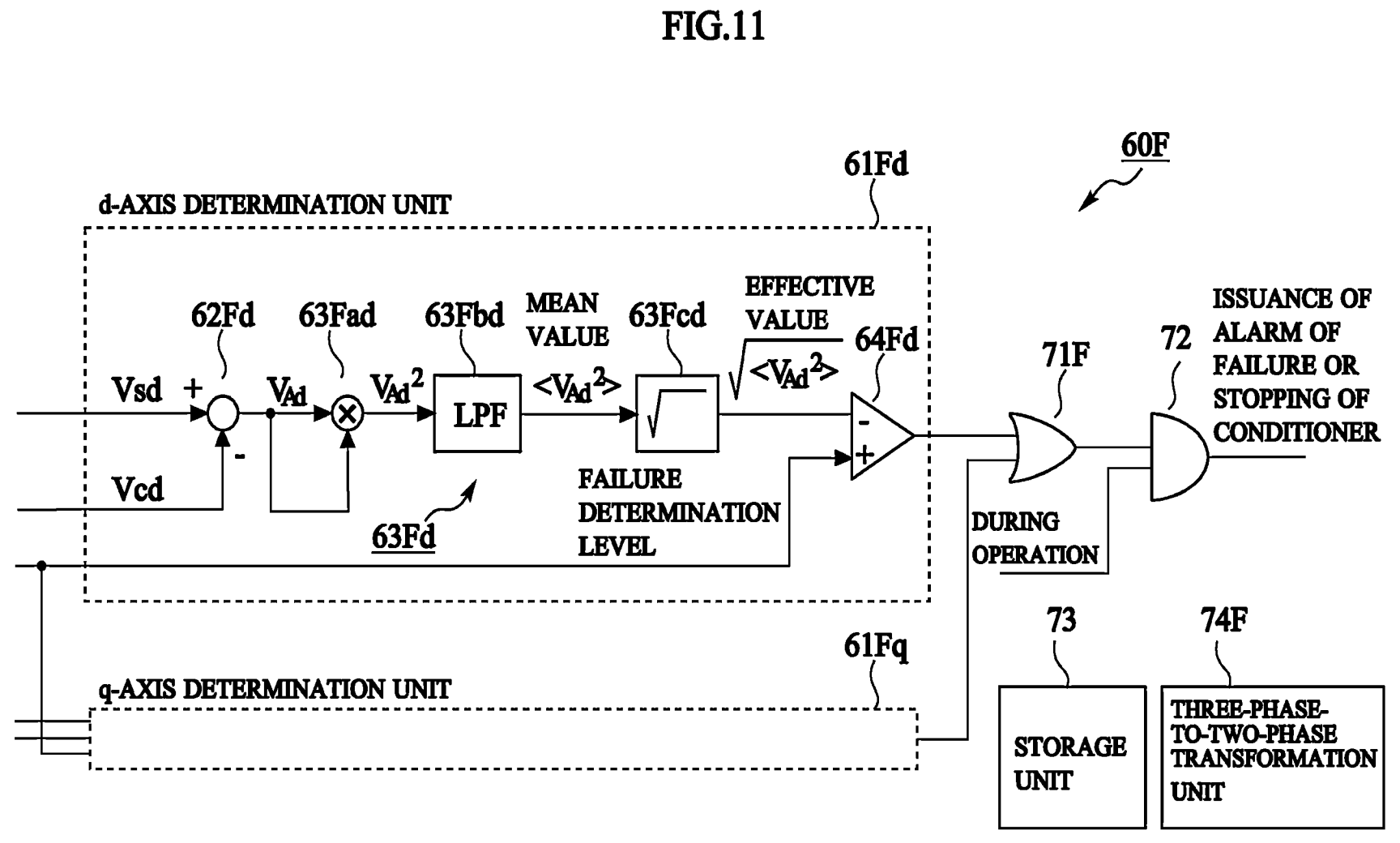

60F d-AXIS DETERMINATION UNIT
61Fd
Vsd
Vcd
+
-
62Fd
$V_{Ad}$
63Fad
$V_{Ad}^2$
63Fbd
LPF
63Fd
MEAN VALUE $\langle V_{Ad}^2 \rangle$
63Fcd
EFFECTIVE VALUE $\sqrt{\langle V_{Ad}^2 \rangle}$
64Fd
FAILURE DETERMINATION LEVEL
71F
DURING OPERATION
72
ISSUANCE OF ALARM OF FAILURE OR STOPPING OF CONDITIONER
61Fq
q-AXIS DETERMINATION UNIT
73
STORAGE UNIT
74F
THREE-PHASE-TO-TWO-PHASE TRANSFORMATION UNIT

FIG.13

| SUBJECT THAT DETECTS FAILURE AND OPERATION AFTER FAILURE IS DETECTED | (CONTROL DEVICE AND (ISSUANCE OF ALARM OF FAILURE OR STOPPING OF DEVICE)) OR (MONITORING DEVICE AND ISSUANCE OF ALARM OF FAILURE) |
|---|---|
| VOLTAGE MEASUREMENT POINT FOR DETECTING FAILURE | (CAPACITOR VOLTAGE AND VOLTAGE ON SYSTEM SIDE OF AC SWITCH) OR (CAPACITOR VOLTAGE AND VOLTAGE ON INVERTER SIDE OF AC SWITCH) OR VOLTAGE BETWEEN BOTH ENDS OF DAMPING RESISTOR OR VOLTAGE BETWEEN BOTH ENDS OF FILTER REACTOR |
| THE NUMBER OF PHASES OF AC OUTPUT OF POWER CONDITIONER | SINGLE PHASE OR THREE PHASES |
| METHOD FOR CALCULATING VOLTAGE TO BE COMPARED WITH THRESHOLD | RAW VALUE OR VALUE TO WHICH LOW PASS FILTER IS APPLIED OR EFFECTIVE VALUE OR AMPLITUDE OF FUNDAMENTAL WAVE COMPONENT |
| COORDINATE SYSTEM IN WHICH VOLTAGE TO BE COMPARED WITH THRESHOLD IS CALCULATED | COORDINATE SYSTEM AT REST OR dq COORDINATE SYSTEM |
| COORDINATE SYSTEM IN WHICH COMPARISON WITH THRESHOLD IS PERFORMED | COORDINATE SYSTEM AT REST OR dq COORDINATE SYSTEM |
| WHAT IS CONNECTED ON AC SIDE OF POWER CONDITIONER | POWER SYSTEM OR LOAD |

POWER CONDITIONING SYSTEM

TECHNICAL FIELD

The present invention relates to a power conditioning system.

BACKGROUND ART

In related art, a power conditioning device is known in which operation for making voltages equal is performed before grid connection operation is performed (before an AC switch is turned on), and then the grid connection operation is started by the AC switch being turned on. The operation for making voltages equal is performed by making an amplitude and a phase of an AC output voltage of the power conditioning device equal to an amplitude and a phase of a system voltage before the grid connection operation is performed (before the AC switch is turned on) (see, for example, PTL 1).

CITATION LIST

Patent Literature

[PTL 1] JP 2017-212838 A

SUMMARY OF THE INVENTION

Problem to be Solved by the Invention

Among AC capacitors to be used as filters of AC output of a power conditioning device, there is, for example, an AC capacitor having a fuse mechanism of separating a capacitor element from a circuit in a case where abnormal heating, or the like, occurs. In a case where the fuse mechanism works, the AC capacitor is put into an open failure state. In such a case, in a power conditioning device in related art, a failure may be detected as a synchronization abnormality during operation for making voltages equal.

However, in the power conditioning device in related art, there can be a possibility that a failure is not detected during operation for making voltages equal although the AC capacitor is in an open failure state. In this case, in the power conditioning device, grid connection operation may be started by the AC switch being turned on after the operation for making voltages equal, and operation may be continued without a failure being detected thereafter. In a case where operation is started in a state where the AC capacitor is in an open failure state, there is a possibility that in the power conditioning device, large harmonic may flow out on a system side, and voltage application concentrates on a normal AC capacitor, and thus, a failure may spread to the normal AC capacitor.

It is therefore an object of the present disclosure to prevent outflow of harmonic to a system side and spread of a failure to a normal AC capacitor by detecting a failure of an AC capacitor and giving a predetermined operation instruction during grid connection operation of a power conditioning device.

Means for Solving the Problems

A power conditioning system according to one aspect includes a power conditioning device which includes an inverter that converts power and outputs AC power, and a filter circuit in which a circuit component provided on an AC output side of the inverter and having at least one of a damping resistor or a filter reactor, and an AC capacitor to be separated from a circuit at the time of failure are connected in series, and a device which includes a voltage recognition unit that recognizes a voltage value of a voltage to be generated by the circuit component, a voltage calculation unit that calculates a predetermined voltage calculation value on the basis of the voltage value of the voltage to be generated by the circuit component, recognized by the voltage recognition unit, a failure determination unit that compares the voltage calculation value calculated by the voltage calculation unit with a predetermined threshold and determines that a failure occurs in the AC capacitor in a case where the voltage calculation value is smaller than the predetermined threshold, and an operation control unit that stops the power conditioning device in a case where the failure determination unit determines that a failure occurs in the AC capacitor during operation of the power conditioning device.

A power conditioning system according to another aspect includes a power conditioning device which includes an inverter that converts power and outputs AC power, and a filter circuit in which a circuit component provided on an AC output side of the inverter and having at least one of a damping resistor or a filter reactor, and an AC capacitor to be separated from a circuit at the time of failure are connected in series, and a device which includes a voltage recognition unit that recognizes a voltage value of a voltage to be generated by the circuit component, a voltage calculation unit that calculates a predetermined voltage calculation value on the basis of the voltage value of the voltage to be generated by the circuit component, recognized by the voltage recognition unit, a failure determination unit that compares the voltage calculation value calculated by the voltage calculation unit with a predetermined threshold and determines that a failure occurs in the AC capacitor in a case where the voltage calculation value is smaller than the predetermined threshold, and an alarm issuance unit that issues an alarm indicating that a failure occurs in the AC capacitor in a case where the failure determination unit determines that a failure occurs in the AC capacitor during operation of the power conditioning device.

Advantageous Effects of the Invention

According to the present disclosure, it is possible to prevent outflow of harmonic to a system side and spread of a failure to a normal AC capacitor by detecting a failure of an AC capacitor and giving a predetermined operation instruction during grid connection operation of a power conditioning device.

BRIEF DESCRIPTION OF THE DRAWINGS

FIG. 1 is a view illustrating a configuration example of a power conditioning system according to a first embodiment.

FIG. 11 is a view illustrating a control configuration example of a control device in a power conditioning system according to a fourth embodiment.

FIG. 13 is a view illustrating examples of combinations of respective components of the present disclosure.

DESCRIPTION OF EMBODIMENTS

Figure 2:
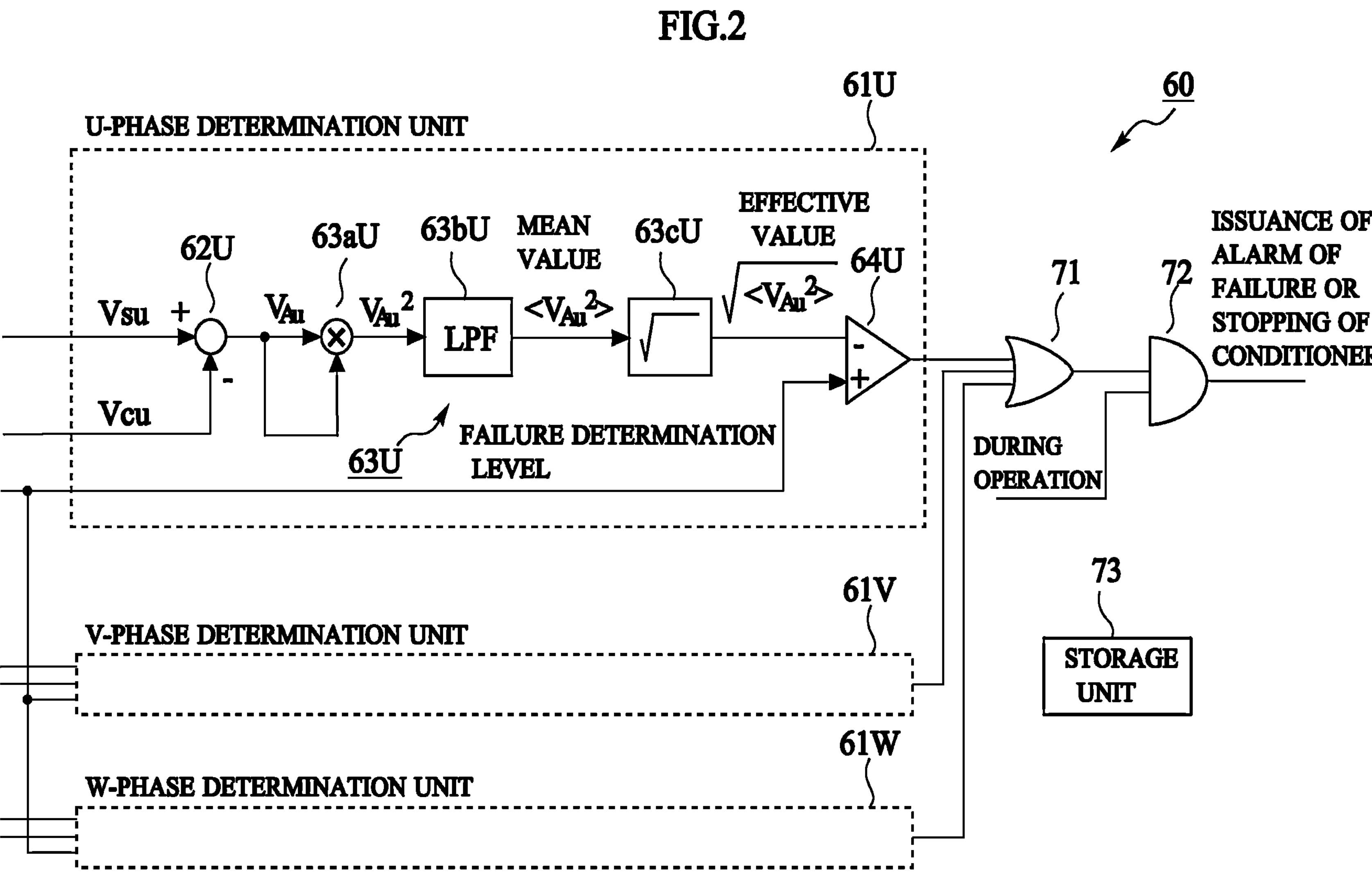
FIG. 2 is a view illustrating a control configuration example of a control device in the power conditioning system illustrated in FIG. 1.

Embodiments of a power conditioning system according to the present disclosure will be described below using the drawings.

First Embodiment

FIG. 1 is a view illustrating a configuration example of a power conditioning system 1 according to a first embodiment.

As illustrated in FIG. 1, the power conditioning system 1 includes photovoltaics 10, an AC power system 20, a power conditioning device 30 (power conditioner 30), and a control device 60 (controller 60).

The power conditioning system (PCS) 1, for example, converts DC power supplied from the photovoltaics 10 into AC power via the power conditioning device 30 and outputs the converted AC power to the AC power system 20. Note that the power conditioning system 1 (power conditioning device 30) is not limited to a device that converts DC power into AC power and may be a device that converts AC power into AC power. Hereinafter, in the present specification, the power conditioning system 1 (power conditioning device 30) will be described as a device that converts DC power into AC power.

The photovoltaics (PV) 10 are connected to one end side (input side) of the power conditioning device 30 and supply DC power to the power conditioning device 30 via the one end side. The photovoltaics 10 are one example of a "DC power supply", and the DC power supply may be an energy storage system (ESS), a DC power supply system, or the like, including a wind power generator, an AC/DC converter, and the like. Note that a power supply to be connected to the one end side (input side) of the power conditioning device 30 is not limited to the DC power supply, and in a case where the power conditioning system 1 (power conditioning device 30) is a device that converts AC power into AC power, an AC power supply may be connected.

The AC power system 20 is a system, or the like, which is connected to the other end side (output side) of the power conditioning device 30 and in which electric power generation, electric power transformation, transmission of electric power, and distribution of electric power are integrated for supplying AC power output from the power conditioning device 30 to power reception facilities of consumers, and, for example, an unspecified load is connected. Note that the AC power system 20 is not limited to a power system and may be a load. Hereinafter, in the present specification, the AC power system 20 will be also referred to as a "system 20".

The power conditioning device 30 includes a DC bus 31, a DC capacitor 32, an inverter circuit 33, an AC circuit 34, an AC reactor 35, an AC switch 36, and a filter circuit 37. The filter circuit 37 includes, for example, a damping resistor 41, a filter reactor 42, and a filter capacitor 43. Further, in the present embodiment, a first voltage sensor 51 is positioned in the filter circuit 37, and a second voltage sensor 52 is positioned on the system 20 side of the AC switch 36 in the AC circuit 34.

Note that as illustrated in FIG. 1, the AC circuit 34, the AC reactor 35, the AC switch 36, the filter circuit 37, the damping resistor 41, the filter reactor 42, and the filter capacitor 43 are provided or positioned in each phase of three phases (a U phase, a V phase and a W phase). In a similar manner, the first voltage sensor 51 and the second voltage sensor 52 are also positioned in each phase of the three phases. Thus, hereinafter, in the present specification, in a case where these components in the respective phases of the three phases are referred to in a distinguished manner, "U", "V" or "W" is added at the end of the reference numeral, and in a case where these components in the respective phases of the three phases are not distinguished, "U", "V" or "W" is not added at the end.

As an example, for example, in a case where the filter capacitors 43 in the U phase, the V phase and the W phase are referred to in a distinguished manner, they are respectively referred to as a "filter capacitor 43U", a "filter capacitor 43V" and a "filter capacitor 43W". On the other hand, for example, in a case where the filter capacitors 43 in the U phase, the V phase and the W phase are not distinguished, they will be simply referred to as a "filter capacitor 43".

The power conditioning device 30 is connected to the photovoltaics 10 via the DC bus 31 on the one end side (input side) in a left part of FIG. 1 and is connected to the system 20 via the AC circuit 34 on the other end side (output side) in a right part of FIG. 1. Further, each unit of the power conditioning device 30 is connected to the control device 60 via a signal line (not illustrated), or the like, and operation is controlled by the control device 60.

In the power conditioning device 30, operation for making voltages equal (synchronization control) is performed before the AC switch 36 is turned on in accordance with control by the control device 60, and thereafter, grid connection operation is started by the AC switch 36 being turned on. Note that the operation for making voltages equal is performed by, for example, an alternating-current-automatic voltage regulator (AC-AVr). If the grid connection operation is started, the power conditioning device 30 converts DC power supplied from the photovoltaics 10 into AC power and outputs the AC power to the system 20 in accordance with control by the control device 60.

The DC bus 31 has a DC switch (not illustrated), has one end connected to the photovoltaics 10 and has the other end connected to a DC end of the inverter circuit 33. The DC bus

31 has a positive side DC bus and a negative side DC bus and supplies DC power supplied from the photovoltaics 10 to the inverter circuit 33. Note that in a case where the power conditioning device 30 converts AC power into AC power, a reference numeral 31 may be an AC circuit.

The DC capacitor 32 is a smoothing capacitor that is, for example, provided between the positive side DC bus and the negative side DC bus in the DC bus 31 and smooths the DC voltage output from the photovoltaics 10. Hereinafter, in the present specification, the DC capacitor 32 will be also referred to as a "direct current (DC) capacitor 32".

The inverter circuit 33 has one end that is a DC end connected to the DC bus 31 and has the other end that is an AC end connected to the AC circuit 34. The inverter circuit 33 is, for example, constituted with a plurality of switching elements such as insulated gate bipolar transistors (IGBTs). The inverter circuit 33 is, for example, controlled by a pulse width modulation (PWM) signal that is a gate drive signal (gate signal) of a switching element, generated at an inverter control unit (not illustrated).

The inverter circuit 33 obtains the DC power supplied from the photovoltaics 10 from the one end side, converts the obtained DC power into AC power in accordance with control by the pulse width modulation signal (gate signal) and outputs the AC power to the AC circuit 34 from the other end side that is an output end. Note that in a case where the power conditioning device 30 is a device that converts AC power into AC power, the inverter circuit 33 may convert the AC power into AC power. Hereinafter, in the present specification, the inverter circuit 33 will be also simply referred to as an "inverter 33". Further, in the present specification, the pulse width modulation signal will be also referred to as a "PWM signal".

The AC circuit 34 has one end side connected to the output end of the inverter 33 and has the other end side connected to the system 20. The AC circuit 34 is, for example, a three-phase AC circuit of a three-phase three-wire system that supplies three-phase AC power that is a combination of single-phase AC of three systems obtained by shifting phases of currents or voltages from each other, using three electric wires, cables, conductors, or the like. The AC circuit 34 supplies the AC power converted by the inverter 33 to the system 20 side.

The AC reactor 35 is a smoothing element that is connected to the AC circuit 34 on the output side of the inverter 33 in series and, for example, has an effect of reducing noise and an effect of reducing a surge voltage. The AC reactor 35 reduces ripples (vibration) occurring when the switching element of the inverter 33 performs switching along with the filter capacitor 43 connected in an L shape via the AC circuit 34 and a branch point 34*a*, for example. Hereinafter, in the present specification, the AC reactor 35 will be also referred to as an "alternating-current (AC) reactor 35".

The AC switch (AC switch) 36 is, for example, provided in series on the system 20 side of the branch point 34*a* described above in the AC circuit 34. The AC switch 36 turns on (connects) or turns off (shuts off) between the AC circuit 34 and the system 20 in accordance with a turning-on instruction or a turning-off instruction from the control device 60, a monitoring device (not illustrated) which will be described later or an operator (not illustrated). If the AC switch 36 is turned off, outflow of the AC power supplied from the inverter 33 to the system 20 is shut off. The AC switch 36 is turned off when the power conditioning device 30 performs operation for making voltages equal (synchronization control) with the system 20 side upon start (activation) of the power conditioning device 30 and is turned on when grid connection operation is started. Hereinafter, in the present specification, the AC switch 36 will be also referred to as an "AC switch 36".

The filter circuit 37, which is a circuit that is made to branch via the branch point 34*a* between the AC reactor 35 and the AC switch 36 in the AC circuit 34 on the AC output side of the inverter 33, has one end connected to the branch point 34*a*. In the filter circuit 37, for example, the damping resistor 41, the filter reactor 42, and the filter capacitor 43 are connected in series. Note that it is only necessary that the damping resistor 41, the filter reactor 42, and the filter capacitor 43 are connected in series, and connection order is not limited to this order. Further, in the present embodiment, while both the damping resistor 41 and the filter reactor 42 are connected to the filter circuit 37, the present invention is not limited to this, and it is only necessary that at least one of these is connected.

The damping resistor 41 is, for example, an electric resistor for attenuating noise by reducing sharpness of resonance of an LC resonance circuit and in the filter circuit 37, is connected in series with the filter reactor 42 and the filter capacitor 43. Note that the damping resistor 41 is one example of a "circuit component".

The filter reactor 42, for example, constitutes an LC resonance circuit that cancels out each other's potentials with the filter capacitor 43 at a specific resonance frequency and in the filter circuit 37, is connected in series with the damping resistor 41 and the filter capacitor 43. Note that the filter reactor 42 is one example of the "circuit component".

The filter capacitor 43 is, for example, an electronic component that stores or emits electricity (charge) and in the filter circuit 37, is connected in series with the damping resistor 41 and the filter reactor 42. The filter capacitor 43, for example, reduces ripples (vibration) occurring when the switching element (not illustrated) of the inverter 33 performs switching along with the AC reactor 35 connected in an L shape. The filter capacitor 43 prevents harmonics (harmonic current) from flowing out to the system 20 side along with the AC reactor 35.

The filter capacitor 43 only requires to be at least one AC capacitor to be separated from a circuit at the time of failure and has, for example, a fuse mechanism (not illustrated) for separating the capacitor element from the circuit in a case where abnormal heating, or the like, occurs. Note that the filter capacitor 43 is one example of an "AC capacitor (AC capacitor)".

The first voltage sensor 51 (51U, 51V, 51W), which is, for example, a publicly known AC voltmeter, AC voltage sensor, or the like, is provided at a position at which capacitor voltages Vcu, Vcv and Vcw that are three-phase voltage values of voltages of the filter capacitor 43 of the filter circuit 37 can be detected. The first voltage sensor 51 detects each of the three-phase capacitor voltages Vcu, Vcv and Vcw. Note that a position where the first voltage sensor 51 is provided is not limited to the position illustrated in FIG. 1 and may be any position if the capacitor voltages Vcu, Vcv and Vcw can be detected. The capacitor voltages Vcu, Vcv and Vcw detected by the first voltage sensor 51 are obtained by the control device 60. Hereinafter, in the present specification, the capacitor voltages Vcu, Vcv and Vcw will be collectively referred to as a "capacitor voltage Vc" without "u", "v" or "w" being added at the end in a case where the three-phase capacitor voltages Vcu, Vcv and Vcw are not distinguished.

The second voltage sensor 52 (52U, 52V, 52W), which is, for example, a publicly known AC voltmeter, AC voltage sensor, or the like, is provided between the AC switch 36 and the system 20 and detects each of three-phase system voltages Vsu, Vsv and Vsw that are voltage values of AC voltages in the system 20. Note that a position where the second voltage sensor 52 is provided is not limited to the position illustrated in FIG. 1 and may be any position if the system voltages Vsu, Vsv and Vsw can be detected. The system voltages Vsu, Vsv and Vsw detected by the second voltage sensor 52 are obtained by the control device 60.

Hereinafter, in the present specification, in a case where respective three-phase components with "u", "v" or "w" added at the end, for example, like the system voltages Vsu, Vsv and Vsw are not distinguished, addition of "u", "v" or "w" at the end will be omitted. For example, in a case where in the system voltages Vsu, Vsv and Vsw, three-phase components (three-phase system voltages Vsu, Vsv and Vsw) are not distinguished, "u", "v" or "w" will not be added at the end, and these will be also collectively referred to as a "system voltage Vs".

The control device 60 is, for example, provided inside or outside the power conditioning device 30 and is electrically connected in a wired or wireless manner to respective elements of the power conditioning device 30 including the inverter 33 and respective sensors including the first voltage sensor 51 while wirings, or the like, are omitted in the drawings. Note that the control device 60 has a component or a function of an inverter control unit (not illustrated) that controls operation of the inverter 33 of the power conditioning device 30 by the PWM signal.

The control device 60 includes, for example, a processor 91 (see FIG. 12) such as a central processing unit (CPU) that operates by executing a program. The control device 60 includes a storage unit 73 (see FIG. 2), a memory 92 (see FIG. 12), or the like, which will be described later and, for example, causes the processor 91 to operate by executing a predetermined program stored in the storage unit 73 or the memory 92 to integrally control operation of the power conditioning device 30. Note that the control device 60 may, for example, operate in accordance with an instruction from a monitoring device or a host device (not illustrated) or an instruction accepted from an operator (not illustrated), or the like, via an operation unit (not illustrated). The control device 60 obtains the capacitor voltages Vcu, Vcv and Vcw detected by the first voltage sensor 51 (51U, 51V, 51W) and the system voltages Vsu, Vsv and Vsw detected by the second voltage sensor 52 (52U, 52V, 52W).

Note that in the present embodiment, the control device 60 is not limited to, for example, a device having a component or a function of an inverter control unit (not illustrated) and may be a monitoring device (not illustrated), or the like, that performs control, monitoring, detection of a failure, issuance of an alarm of a failure, and the like, of the power conditioning device 30 other than control of the inverter 33. In this case, the monitoring device (not illustrated) may be provided as a component different from the control device 60 that has a component or a function of the inverter control unit (not illustrated) and controls the inverter 33 in the power conditioning device 30.

Further, in this case, the monitoring device (not illustrated) may, for example, directly obtain values detected by the first voltage sensor 51, the second voltage sensor 52, and the like, from the first voltage sensor 51, the second voltage sensor 52, and the like, or may obtain the values from the control device 60 after the control device 60 obtains the values. Further, in this case, the monitoring device (not illustrated) may, for example, obtain the values as is (raw values) detected by the first voltage sensor 51, the second voltage sensor 52, and the like, from the control device 60 or may obtain the values subjected to predetermined calculation by the control device 60 from the control device 60.

Note that the monitoring device (not illustrated) may be, for example, a host device (not illustrated), or the like, that is connected to a plurality of power conditioning devices 30 in a wired or wireless manner and integrally controls or monitors the connected plurality of power conditioning devices 30. Note that the control device 60 and the monitoring device (not illustrated) are one example of a "device".

FIG. 2 is a view illustrating a control configuration example of the control device 60 in the power conditioning system 1 illustrated in FIG. 1.

As illustrated in FIG. 2, the control device 60 includes a U-phase determination unit 61U, a V-phase determination unit 61V, a W-phase determination unit 61W, a failure detection unit 71, an operation control unit 72, and a storage unit 73.

The U-phase determination unit 61U obtains the U-phase capacitor voltage Vcu from the first voltage sensor 51U, obtains the U-phase system voltage Vsu from the second voltage sensor 52U and obtains a U-phase failure determination level Vthu from the storage unit 73. Then, the U-phase determination unit 61U determines whether or not a failure occurs in the U-phase filter capacitor 43U on the basis of the obtained U-phase capacitor voltage Vcu, U-phase system voltage Vsu and failure determination level Vthu of the U-phase filter capacitor 43U.

The V-phase determination unit 61V obtains the V-phase capacitor voltage Vcv from the first voltage sensor 51V, obtains the V-phase system voltage Vsv from the second voltage sensor 52V and obtains a V-phase failure determination level Vthv from the storage unit 73. Then, the V-phase determination unit 61V determines whether or not a failure occurs in the V-phase filter capacitor 43V on the basis of the obtained V-phase capacitor voltage Vcv, V-phase system voltage Vsv and failure determination level Vthv of the V-phase filter capacitor 43V.

The W-phase determination unit 61W obtains the W-phase capacitor voltage Vcw from the first voltage sensor 51W, obtains the W-phase system voltage Vsw from the second voltage sensor 52W and obtains a W-phase failure determination level Vthw from the storage unit 73. Then, the W-phase determination unit 61W determines whether or not a failure occurs in the W-phase filter capacitor 43W on the basis of the obtained W-phase capacitor voltage Vcw, W-phase system voltage Vsw and failure determination level Vthw of the W-phase filter capacitor 43W.

Note that hereinafter, in the present specification, in a case where components of the U-phase determination unit 61U, the V-phase determination unit 61V and the W-phase determination unit 61W are not distinguished, "U", "V" or "W" at the end will be omitted, and these will be also simply referred to as a "determination unit 61".

Hereinafter, the U-phase determination unit 61U, the V-phase determination unit 61V and the W-phase determination unit 61W have the same components or functions, and thus, description will be provided below using an example of the U-phase determination unit 61U, and description of the V-phase determination unit 61V and the W-phase determination unit 61W will be omitted.

The U-phase determination unit 61U has components or functions of a subtraction unit 62U, an effective value calculation unit 63U, and a failure determination unit 64U.

The subtraction unit 62U obtains the U-phase system voltage Vsu from the U-phase second voltage sensor 52U and obtains the U-phase capacitor voltage Vcu from the U-phase first voltage sensor 51U. The subtraction unit 62U subtracts the obtained capacitor voltage Vcu from the obtained system voltage Vsu to calculate a differential voltage between the system voltage Vsu and the capacitor voltage Vcu.

The differential voltage that is a difference between the system voltage Vsu and the capacitor voltage Vcu is a voltage to be generated by a circuit component that is at least one of the damping resistor 41U or the filter reactor 42U in the U-phase filter circuit 37U. Thus, the subtraction unit 62U recognizes a circuit component voltage VAu that is a voltage value of a voltage to be generated by the circuit component (the damping resistor 41U, the filter reactor 42U) in the filter circuit 37U by obtaining the differential voltage between the system voltage Vsu and the capacitor voltage Vcu. The subtraction unit 62U outputs the recognized circuit component voltage VAu to the effective value calculation unit 63U. Note that the subtraction unit 62U is one example of a "voltage recognition unit".

The effective value calculation unit 63U obtains the circuit component voltage VAu from the subtraction unit 62U and performs predetermined calculation on the obtained circuit component voltage VAu to calculate an effective value VARMSu of the circuit component voltage VAu. The effective value calculation unit 63U outputs the calculated effective value VARMSu of the circuit component voltage VAu to the failure determination unit 64U. Note that the effective value calculation unit 63U is one example of a "voltage calculation unit", and the effective value VARMSu of the circuit component voltage VAu is one example of a "predetermined voltage calculation value".

The effective value calculation unit 63U has components or functions of a multiplication unit 63aU, a low pass filter (LPF) 63bU and a square root calculation unit 63cU. Note that hereinafter, in the present specification, the low pass filter 63bU will be also referred to as an "LPF 63bU".

The multiplication unit 63aU obtains the circuit component voltage VAu from the subtraction unit 62U and calculates a square value VAu2 of the circuit component voltage VAu that is a value obtained by squaring the obtained circuit component voltage VAu. The multiplication unit 63aU outputs the calculated square value VAu2 of the circuit component voltage VAu to the LPF 63bU.

The low pass filter (LPF) 63bU obtains the square value VAu2 of the circuit component voltage VAu from the multiplication unit 63aU and obtains a mean value <VAu2> of the square value VAu2 of the circuit component voltage VAu by performing filter processing on the obtained square value VAu2. The LPF 63bU outputs the obtained mean value □VAu2> to the square root calculation unit 63cU. Note that in the present specification, there is a case where angle brackets (< >) are used as symbols indicating a mean value.

The square root calculation unit 63cU obtains the mean value <VAu2> of the square value VAu2 of the circuit component voltage VAu from the LPF 63bU and obtains the effective value VARMSu of the circuit component voltage VAu by calculating a square root <VAu2> of the obtained mean value <VAu2>. The square root calculation unit 63cU outputs the effective value VARMSu of the circuit component voltage VAu that is the calculated root mean square (□VAu2>) of the circuit component voltage VAu to the failure determination unit 64. Note that a method for obtaining the effective value VARMSu of the circuit component voltage VAu is not limited to the above-described method using root mean square (RMS), and other well-known methods may be used.

The failure determination unit 64U obtains the effective value VARMSu of the circuit component voltage VAu from the effective value calculation unit 63U (square root calculation unit 63cU) and obtains the failure determination level Vthu of the U-phase filter capacitor 43U from the storage unit 73 via a system bus (not illustrated), or the like. The failure determination unit 64U compares the effective value VARMSu of the circuit component voltage VAu with the U-phase failure determination level Vthu and determines whether or not the failure determination level Vthu is greater than the effective value VARMSu.

In other words, for example, if an open failure occurs in the U-phase filter capacitor 43U, the effective value VARMSu of the circuit component voltage VAu to be generated by the circuit component in the filter circuit 37U decreases or disappears. Thus, the failure determination unit 64U determines whether or not a failure occurs in the U-phase filter capacitor 43U by comparing the effective value VARMSu of the circuit component voltage VAu with the failure determination level Vthu. Note that the failure determination level Vthu is, for example, set to be smaller than the effective value VARMSu of the circuit component voltage VAu to be generated by the circuit component when the filter capacitor 43U is normal and set to be a greater value than the effective value VARMSu to be generated when an open failure occurs.

Note that the effective value VARMSu to be generated by the circuit component when the filter capacitor 43U is normal and the effective value VARMSu to be generated by the circuit component when an open failure occurs may be, for example, obtained through actual measurement or may be obtained through theoretical calculation, simulation, or the like. Further, the failure determination level Vthu may be, for example, obtained through actual measurement or may be obtained through theoretical calculation, simulation, or the like. Further, the effective value VARMSu of the circuit component voltage VA to be generated by the circuit component of each phase and the failure determination level Vth may be the same in the respective phases or may be different in the respective phases. Note that the failure determination level Vthu is one example of a "predetermined threshold".

The failure determination unit 64U determines that a failure occurs in the U-phase filter capacitor 43U in a case where the failure determination level Vthu is greater than the effective value VARMSu. In this case, the failure determination unit 64U outputs "1" indicating that a failure occurs in the U-phase filter capacitor 43U to the failure detection unit 71.

On the other hand, the failure determination unit 64U determines that a failure does not occur in the U-phase filter capacitor 43U in a case where the failure determination level Vthu is smaller than the effective value VARMSu. In this case, the failure determination unit 64U outputs "0" indicating that a failure does not occur in the U-phase filter capacitor 43U to the failure detection unit 71. In this case, the failure determination unit 64U may continue to output "0" to the failure detection unit 71 until the failure determination level Vthu becomes greater than the effective value VARMSu, and the failure determination unit 64U determines that a failure occurs in the U-phase filter capacitor 43U. Alternatively, in this case, the failure determination unit 64U does not have to output anything in particular to the failure detection unit 71 until the failure determination level Vthu becomes greater than the effective value VARMSu, and the failure determination unit 64U determines that a failure occurs in the U-phase filter capacitor 43U.

Note that as described above, the U-phase determination unit 61U, the V-phase determination unit 61V and the W-phase determination unit 61W have the same components or functions, and thus, description of the components and operation of the V-phase determination unit 61V and the W-phase determination unit 61W will be omitted.

The failure detection unit 71 obtains output from each of the failure determination unit 64U, the failure determination unit 64V and the failure determination unit 64W and obtains information as to whether or not a failure occurs in the filter capacitor 43 (one of 43U, 43V and 43W). Then, the failure detection unit 71 determines whether or not "1" indicating that a failure occurs in the filter capacitor 43 (one of 43U, 43V and 43W) has been obtained from output of one of the failure determination units 64U, 64V and 64W.

In a case where the failure detection unit 71 determines that "1" indicating that a failure occurs in the filter capacitor 43 has been obtained from output of one of the failure determination units 64U, 64V and 64W, the failure detection unit 71 outputs "1" indicating that a failure of the filter capacitor 43 has been detected to the operation control unit 72.

On the other hand, in a case where the failure detection unit 71 determines that "1" has not been obtained from output of any of the failure determination units 64U, 64V and 64W, the failure detection unit 71 outputs "0" indicating that a failure of the filter capacitor 43 has not been detected to the operation control unit 72. In this case, the failure detection unit 71 may continue to output "0" to the operation control unit 72 until the failure detection unit 71 determines that "1" indicating that a failure of the filter capacitor 43 has been detected has been obtained from one of the failure determination units 64U, 64V and 64W. Alternatively, in this case, the failure detection unit 71 does not have to output anything in particular to the operation control unit 72 until the failure detection unit 71 determines that "1" indicating that a failure of the filter capacitor 43 has been detected has been obtained from one of the failure determination units 64U, 64V and 64W.

Note that the failure determination unit 64U, the failure determination unit 64V, the failure determination unit 64W and the failure detection unit 71 are one example of a "failure determination unit".

The operation control unit 72 obtains information as to whether or not a failure of the filter capacitor 43 has been detected, from the failure detection unit 71. For example, the operation control unit 72 obtains "1" indicating that a failure has been detected from the failure detection unit 71 in a case where the failure detection unit 71 detects a failure of the filter capacitor 43. On the other hand, for example, the operation control unit 72 obtains "0" indicating that a failure has not been detected from the failure detection unit 71 in a case where the failure detection unit 71 does not detect a failure of the filter capacitor 43. Note that in this case, the operation control unit 72 does not have to obtain anything in particular from the failure detection unit 71 until "1" indicating that a failure of the filter capacitor 43 has been detected has been obtained from the failure detection unit 71.

Further, the operation control unit 72 obtains information as to whether or not the power conditioning device 30 is operating (during grid connection operation) from, for example, an inverter control unit (not illustrated), or the like. For example, the operation control unit 72 obtains "1" indicating that the power conditioning device 30 is operating from, for example, an inverter control unit (not illustrated), or the like, in a case where the power conditioning device 30 is operating and obtains "0" indicating that the power conditioning device 30 is not operating in a case where the power conditioning device 30 is not operating. Note that in this case, the operation control unit 72 does not have to obtain anything in particular from, for example, the inverter control unit (not illustrated), or the like, until "1" indicating that the power conditioning device 30 is operating is obtained.

Then, the operation control unit 72 determines whether or not "1" indicating that a failure of the filter capacitor 43 has been detected has been obtained from the failure detection unit 71 while "1" indicating that the power conditioning device 30 is operating is obtained, for example, from the inverter control unit (not illustrated), or the like.

The operation control unit 72 issues an alarm or warning (failure information) indicating that a failure occurs in the filter capacitor 43 in a case where "1" indicating that a failure of the filter capacitor 43 has been detected has been obtained while "1" indicating that the power conditioning device 30 is operating is obtained.

In this case, the operation control unit 72 issues an alarm or warning (failure information), for example, by outputting failure display, an alarm, a lamp, or the like, on a display screen, a control panel (not illustrated), or the like, of the power conditioning device 30 or, for example, by outputting a signal, or the like, indicating a failure to a monitoring device, a host device (not illustrated), or the like. Note that the operation control unit 72 is one example of an "alarm issuance unit".

Further, the operation control unit 72 gives an operation instruction to respective units of the power conditioning device 30 so as to stop the power conditioning device 30 in a case where "1" indicating that a failure of the filter capacitor 43 has been detected has been obtained while "1" indicating that the power conditioning device 30 is operating is obtained.

In this case, the operation control unit 72, for example, gives an operation instruction to the inverter control unit (not illustrated) to protect and stop (gate block) switching operation of the semiconductor switching elements of the inverter 33 and turns off all the gate signals. This causes the operation control unit 72 to stop the inverter 33 and stop the power conditioning device 30. Alternatively, the operation control unit 72 turns off the AC switch 36 and stops the power conditioning device 30 by, for example, giving an operation instruction of performing protection operation of turning off the AC switch 36, or the like. Alternatively, the operation control unit 72 stops the inverter 33 by, for example, giving an operation instruction of stopping the inverter 33 and turns off the AC switch 36 and stops the power conditioning device 30 by giving an operation instruction of turning off the AC switch 36.

Note that the operation control unit 72 (control device 60) may issue an alarm or warning (failure information) indicating that a failure occurs in the filter capacitor 43 and may give an operation instruction to each unit of the power conditioning device 30 to stop the power conditioning device 30. Alternatively, the operation control unit 72 (control device 60) may have a function of at least one of issuance of an alarm or warning (failure information) indicating that a failure occurs in the filter capacitor 43 or issuance of an operation instruction to each unit of the power conditioning device 30 to stop the power conditioning device 30.

Then, one or both of the functions may be provided at a monitoring device, a host device (not illustrated), or the like. Further, for example, the operation control unit 72 (control device 60) may issue an alarm, or the like, indicating that a failure occurs in the filter capacitor 43 and may give an operation instruction to stop the power conditioning device 30 in a case where an operation instruction is received from the monitoring device, the host device (not illustrated), an operator, or the like, that has obtained the alarm, or the like.

Note that the operation control unit 72 issues neither an alarm or warning (failure information) nor an operation instruction in a case where one of information indicating whether or not the power conditioning device 30 is operating and information indicating whether or not a failure of the filter capacitor 43 has been detected is "0".

The storage unit 73 is, for example, a volatile or non-volatile storage medium such as a hard disk drive (HDD), a solid state drive (SSD), a dynamic random access memory (DRAM) and other semiconductor memories. The storage unit 73, for example, stores programs necessary for operation of the respective units of the control device 60, and the respective units of the control device 60 write and read various kinds of information. The storage unit 73, for example, stores values obtained by respective sensors such as the first voltage sensor 51 and the second voltage sensor 52, values to be used in various kinds of calculation, values of the failure determination level Vth to be used at the failure determination unit 64, and the like.

The storage unit 73 is, for example, connected to the respective units of the control device 60 via a bus (system bus) (not illustrated), or the like. Note that the storage unit 73 may be provided outside the control device 60 and may be connected to the control device 60 in a wired or wireless manner, and may be an external storage medium, or the like, such as a memory card and a digital versatile disc (DVD) or may be an online storage, or the like. Further, the storage unit 73 may also serve as a memory 92 (see FIG. 12) which will be described later.

Operational Effects of First Embodiment

According to the first embodiment illustrated in FIG. 1 and FIG. 2, the determination unit 61 of each phase recognizes the circuit component voltage VA of each phase on the basis of the capacitor voltage Vc of each phase and the system voltage Vs of each phase. Further, the determination unit 61 of each phase calculates the effective value VARMS of the circuit component voltage VA of each phase on the basis of the recognized circuit component voltage VA of each phase. Then, the determination unit 61 of each phase compares the effective value VARMS of the circuit component voltage VA of each phase with a predetermined failure determination level Vth to determine whether or not a failure occurs in the filter capacitor 43 of each phase. In other words, in the first embodiment illustrated in FIG. 1 and FIG. 2, by obtaining the circuit component voltage VA of the circuit component of the filter circuit 37 (AC filter) and comparing an amount substantially proportional to a magnitude of the obtained circuit component voltage VA with a predetermined threshold, a failure of the filter capacitor 43 is detected. Here, the "amount substantially proportional to a magnitude of the circuit component voltage VA" is, for example, an effective value, an absolute value, or the like. For example, a current flows through the filter circuit 37 in normal times, and thus, a voltage is generated in each circuit component. However, in a case where an open failure occurs in the filter capacitor 43, and a current does not flow, a voltage is not generated in each circuit component. In a case where a voltage is not generated in the circuit component, the amount substantially proportional to the magnitude of the circuit component voltage VA becomes smaller than the predetermined threshold, and thus, by comparing the amount substantially proportional to the magnitude of the circuit component voltage VA (effective value) with the predetermined threshold, a failure of the filter capacitor 43 can be detected. In other words, according to the first embodiment illustrated in FIG. 1 and FIG. 2, a failure of the filter capacitor 43 can be detected on the basis of the circuit component voltage VA of one of the three phases.

Further, the failure detection unit 71 outputs information indicating that a failure occurs in the filter capacitor 43 to the operation control unit 72 when the failure detection unit 71 determines that a failure occurs in the filter capacitor 43 of one of the three phases (the U phase, the V phase and the W phase). Then, when the operation control unit 72 obtains the information indicating that a failure occurs in the filter capacitor 43 while the power conditioning device 30 is operating, the operation control unit 72 provides a predetermined operation instruction to the power conditioning device 30. By this means, according to the first embodiment illustrated in FIG. 1 and FIG. 2, it is possible to prevent outflow of harmonics to the system 20 side and spread of a failure to the normal filter capacitor 43.

First Modification of First Embodiment

Figure 3:
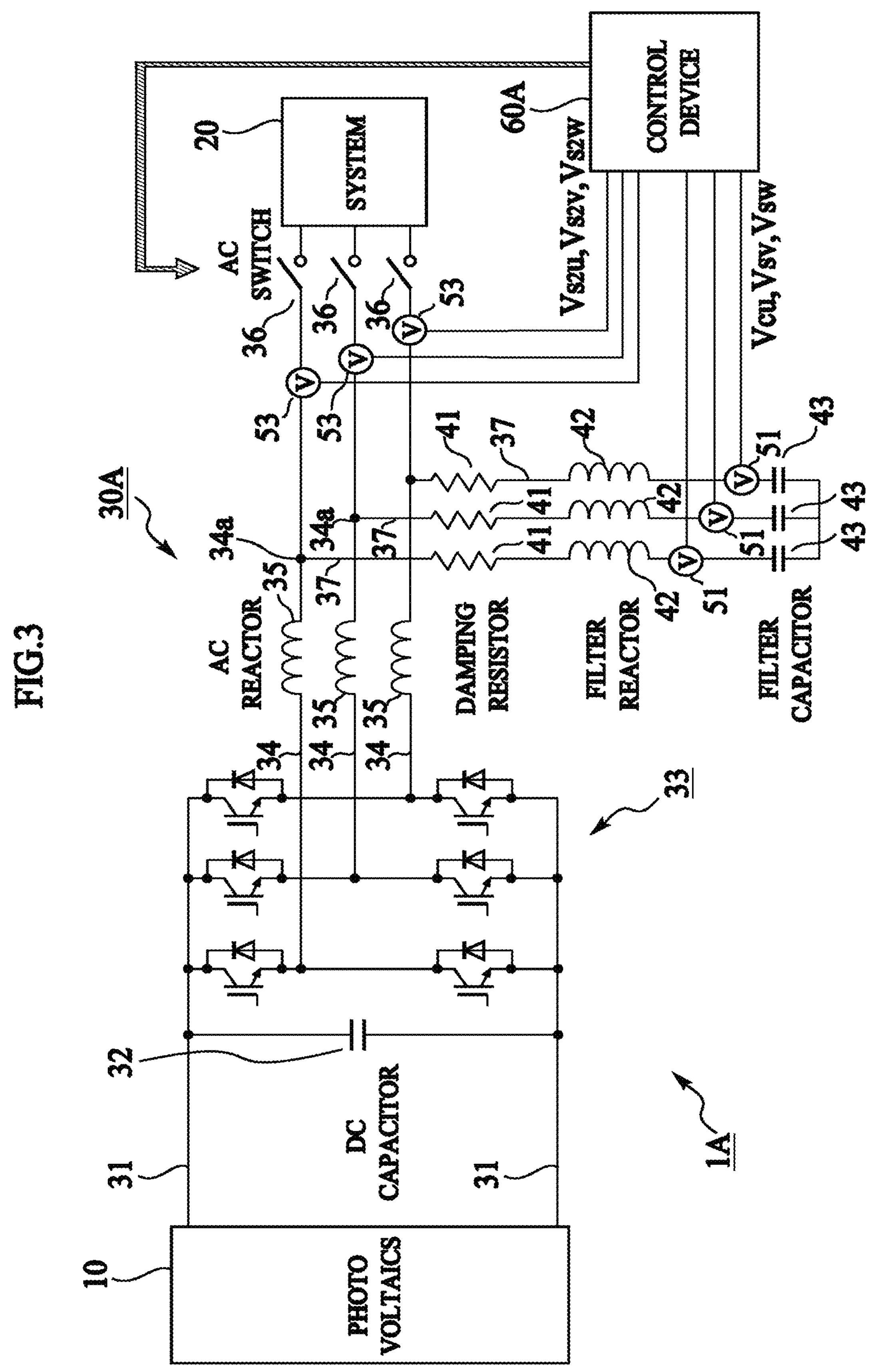
FIG. 3 is a view illustrating a configuration example of a power conditioning system according to a first modification of the first embodiment.

FIG. 3 is a view illustrating a configuration example of a power conditioning system 1A according to a first modification of the first embodiment. Note that in the first modification of the first embodiment, the same reference numerals will be assigned to components that are the same as or similar to those in the embodiment illustrated in FIG. 1 and FIG. 2, and detailed description will be omitted or simplified.

While a configuration of the power conditioning system 1A (power conditioning device 30A) illustrated in FIG. 3 is substantially similar to that of the power conditioning system 1 (power conditioning device 30) illustrated in FIG. 1, part of the configuration is changed. In the power conditioning system 1A (power conditioning device 30A), the second voltage sensor 52 is removed, and a third voltage sensor 53 is provided.

The third voltage sensor 53 (53U, 53V, 53W), which is, for example, a publicly known AC voltmeter, AC voltage sensor, or the like, is provided between the inverter 33 and the AC switch 36 in the AC circuit 34. The third voltage sensor 53 detects each of inverter voltages Vs2*u*, Vs2*v* and Vs2*w* of three phases that are voltage values on the inverter 33 side of the AC switch 36 in the AC circuit 34.

Note that a position where the third voltage sensor 53 is provided is not limited to the position illustrated in FIG. 3 and may be any position if the inverter voltages Vs2*u*, Vs2*v* and Vs2*w* can be detected. The inverter voltages Vs2*u*, Vs2*v* and Vs2*w* detected by the third voltage sensor 53 are obtained by the control device 60A.

Figure 4:
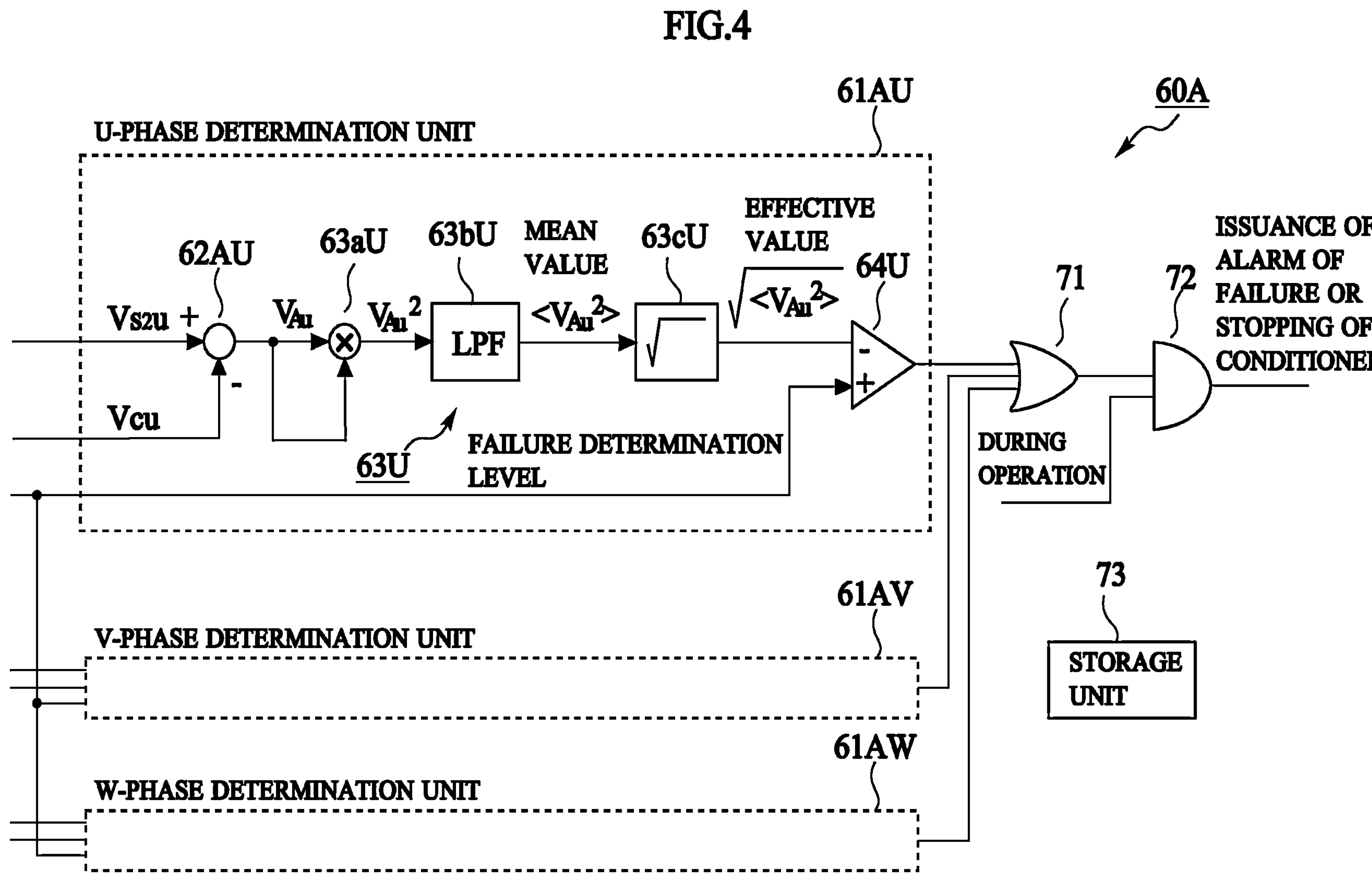
FIG. 4 is a view illustrating a control configuration example of a control device in the power conditioning system illustrated in FIG. 3.

FIG. 4 is a view illustrating a control configuration example of a control device 60A in the power conditioning system 1A illustrated in FIG. 3. While a configuration of the control device 60A illustrated in FIG. 4 is substantially similar to the configuration of the control device 60 illustrated in FIG. 2, each determination unit 61A has a component or a function of a subtraction unit 62A in place of the subtraction unit 62. A subtraction unit 62AU of a U-phase determination unit 61AU will be described below. Note that the control device 60A is one example of the "device" and may be a monitoring device (not illustrated), or the like, in a similar manner to the control device 60 illustrated in FIG. 2.

The subtraction unit 62AU obtains the U-phase inverter voltage Vs2*u* from a U-phase third voltage sensor 53U and obtains a U-phase capacitor voltage Vcu from the U-phase first voltage sensor 51U. The subtraction unit 62AU subtracts the obtained capacitor voltage Vcu from the obtained inverter voltage Vs2*u* to calculate a differential voltage between the inverter voltage Vs2*u* and the capacitor voltage Vcu.

By this means, the subtraction unit 62AU recognizes the circuit component voltage VAu that is a voltage value of a voltage to be generated by the circuit component in the filter circuit 37U by obtaining the differential voltage between the inverter voltage Vs2*u* and the capacitor voltage Vcu. The subtraction unit 62AU outputs the recognized circuit component voltage VAu to the effective value calculation unit 63U. Note that the subtraction unit 62AU is one example of the "voltage recognition unit".

As described above, in the first modification of the first embodiment illustrated in FIG. 3 and FIG. 4, the subtraction unit 62AU recognizes the circuit component voltage VAu by obtaining the differential voltage between the inverter voltage Vs2*u* and the capacitor voltage Vcu. By this means, according to the first modification of the first embodiment illustrated in FIG. 3 and FIG. 4, it is possible to provide operational effects similar to those in the embodiment illustrated in FIG. 1 and FIG. 2.

Second Modification of First Embodiment

Figure 5:
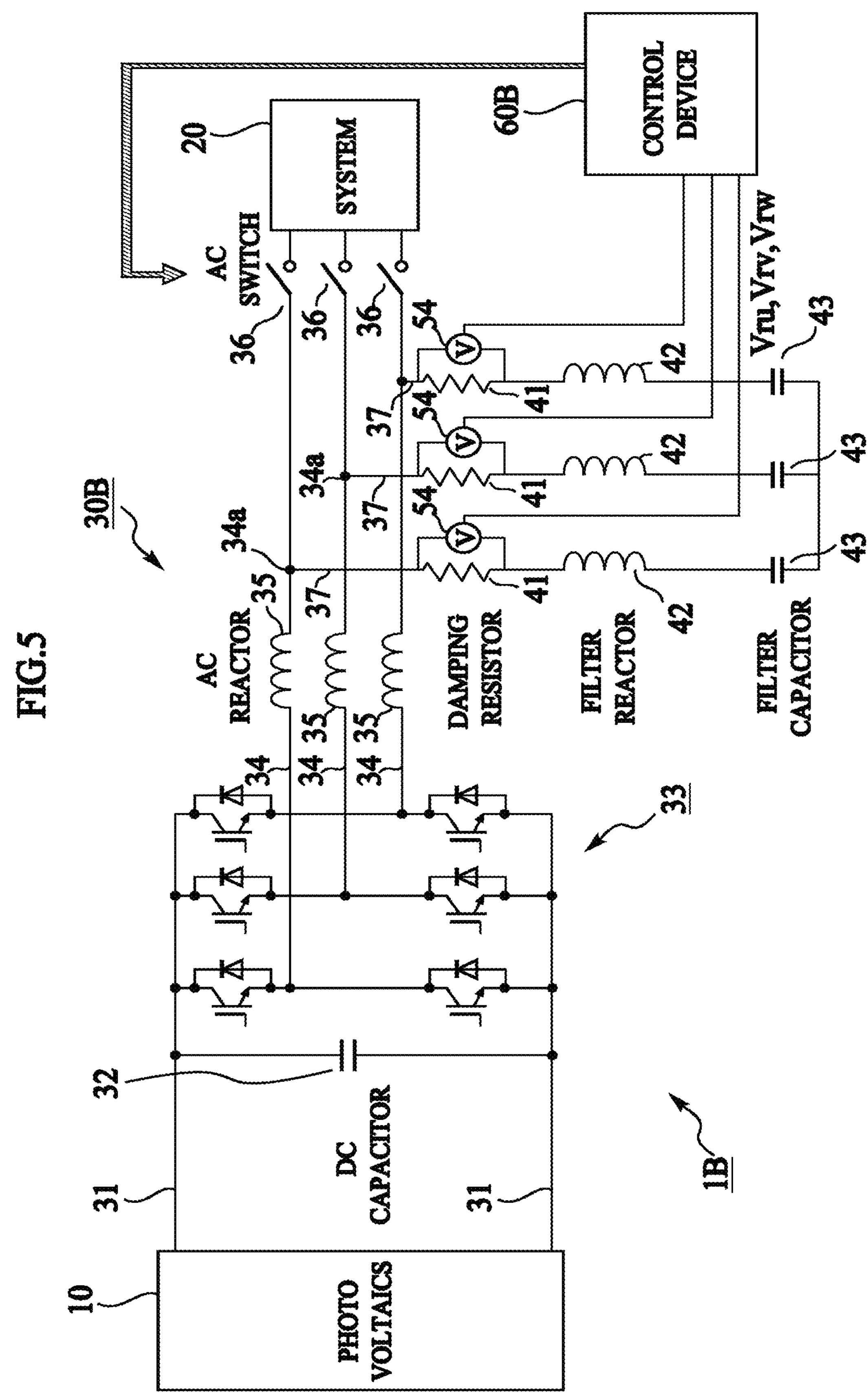
FIG. 5 is a view illustrating a configuration example of a power conditioning system according to a second modification of the first embodiment.

FIG. 5 is a view illustrating a configuration example of a power conditioning system 1B in a second modification of the first embodiment. Note that in the second modification of the first embodiment, the same reference numerals will be assigned to components that are the same as or similar to those in the embodiment illustrated in FIG. 1 to FIG. 4, and detailed description will be omitted or simplified.

While a configuration of the power conditioning system 1B (power conditioning device 30B) illustrated in FIG. 5 is substantially similar to the configuration of the power conditioning system 1 (power conditioning device 30) illustrated in FIG. 1, part of the configuration is changed. In the power conditioning system 1B (power conditioning device 30B), the first voltage sensor 51 and the second voltage sensor 52 are removed, and a fourth voltage sensor 54 is provided.

The fourth voltage sensor 54 (54U, 54V, 54W), which is, for example, a publicly known AC voltmeter, AC voltage sensor, or the like, is provided at a position at which a voltage Vr between both ends of the damping resistor 41 can be detected in the filter circuit 37. The fourth voltage sensor 54 detects each of voltages Vru, Vrv and Vrw between both ends of the damping resistor 41 in the filter circuit 37.

Note that the position at which the fourth voltage sensor 54 is provided is not limited to the position illustrated in FIG. 5 and may be any position if the voltages Vru, Vrv and Vrw between both ends of the damping resistor 41 can be detected. The voltages Vru, Vrv and Vrw between both ends of the damping resistor 41 detected by the fourth voltage sensor 54 are obtained by the control device 60B. Note that the fourth voltage sensor 54 may detect voltages between both ends of the damping resistor 41 and the filter reactor 42.

Figure 6:
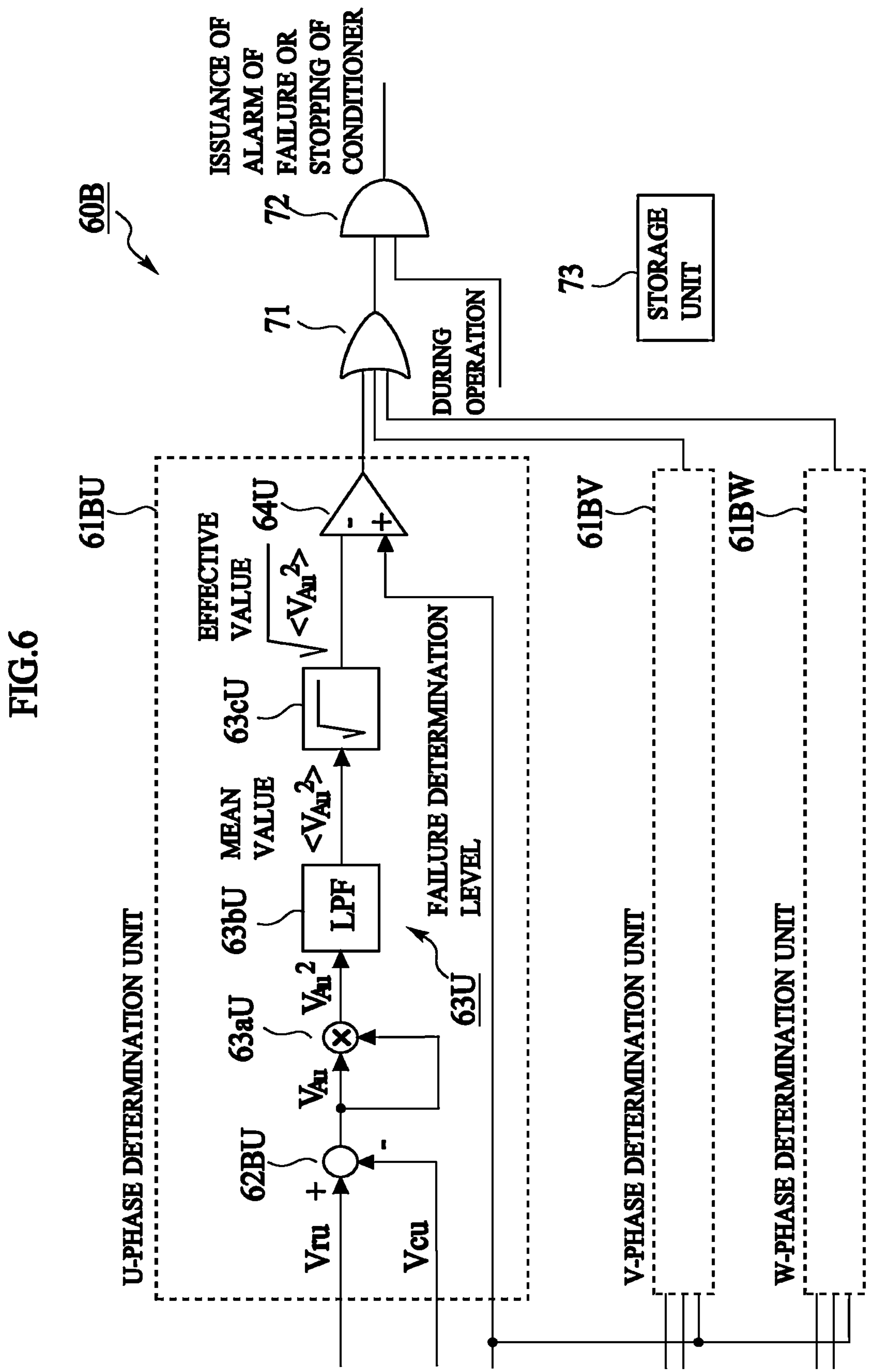
FIG. 6 is a view illustrating a control configuration example of a control device in the power conditioning system illustrated in FIG. 5.

FIG. 6 is a view illustrating a control configuration example of the control device 60B in the power conditioning system 1B illustrated in FIG. 5. While the configuration of the control device 60B illustrated in FIG. 6 is substantially similar to the configuration of the control device 60 illustrated in FIG. 2, each determination unit 61B has a component or a function of a voltage recognition unit 62B in place of the subtraction unit 62. A voltage recognition unit 62BU of the U-phase determination unit 61BU will be described below. Note that the control device 60B is an example of the "device" and may be a monitoring device (not illustrated), or the like, in a similar manner to the control device 60 illustrated in FIG. 2.

The voltage recognition unit 62BU obtains the voltage Vru between both ends of the U-phase damping resistor 41U from the U-phase fourth voltage sensor 54U. The voltage recognition unit 62BU recognizes the circuit component voltage VAu that is a voltage value of a voltage to be generated by the circuit component in the filter circuit 37U on the basis of the obtained voltage Vru between both ends of the damping resistor 41U.

Note that in a case where, for example, only the damping resistor 41U is provided as the circuit component of the filter circuit 37U, the voltage recognition unit 62BU may recognize the obtained voltage Vru between both ends of the damping resistor 41U as the circuit component voltage VAu. Further, in a case where, for example, circuit components other than the damping resistor 41U are also provided as the circuit components of the filter circuit 37U, the voltage recognition unit 62BU may perform predetermined calculation on the obtained voltage Vru between both ends of the damping resistor 41U and recognize the result as the circuit component voltage VAu. The voltage recognition unit 62BU outputs the recognized circuit component voltage VAu to the effective value calculation unit 63U. Note that the voltage recognition unit 62BU is one example of the "voltage recognition unit".

As described above, in the second modification of the first embodiment illustrated in FIG. 5 and FIG. 6, the voltage recognition unit 62BU recognizes the circuit component voltage VAu on the basis of the voltage Vru between both ends of the damping resistor 41U. By this means, according to the second modification of the first embodiment illustrated in FIG. 5 and FIG. 6, it is possible to provide operational effects similar to those in the embodiment illustrated in FIG. 1 to FIG. 4.

Third Modification of First Embodiment

Figure 7:
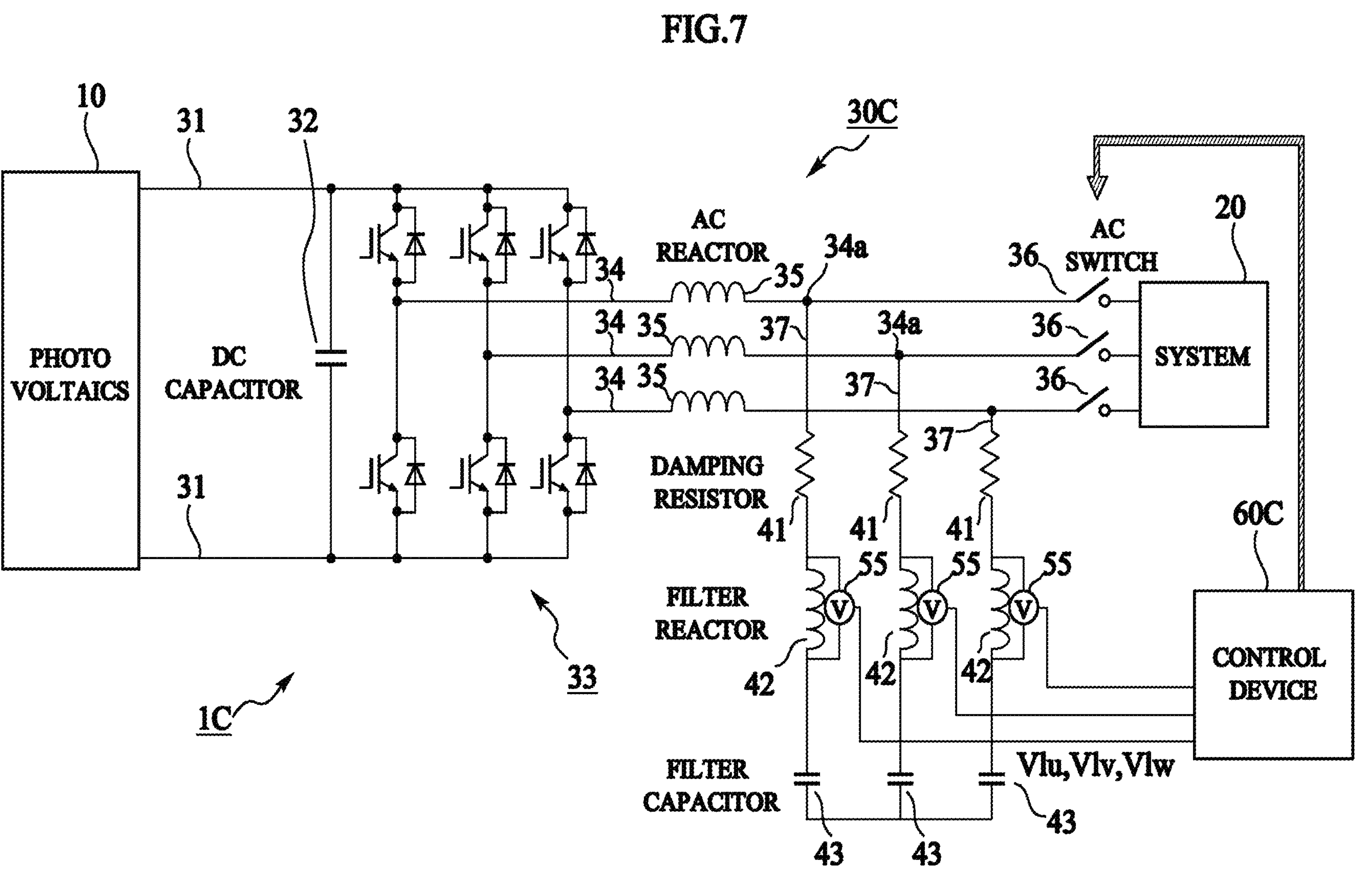
FIG. 7 is a view illustrating a configuration example of a power conditioning system according to a third modification of the first embodiment.

FIG. 7 is a view illustrating a configuration example of a power conditioning system 1C according to a third modification of the first embodiment. Note that in the third modification of the first embodiment, the same reference numerals will be assigned to components that are the same as or similar to the components in the embodiment illustrated in FIG. 1 to FIG. 6, and detailed description will be omitted or simplified.

While a configuration of the power conditioning system 1C (power conditioning device 30C) illustrated in FIG. 7 is substantially similar to the configuration of the power conditioning system 1 (power conditioning device 30) illustrated in FIG. 1, part of the configuration is changed. In the power conditioning system 1C (power conditioning device 30C), the first voltage sensor 51 and the second voltage sensor 52 are removed, and a fifth voltage sensor 55 is provided.

The fifth voltage sensor 55 (55U, 55V, 55W), which is, for example, a publicly known AC voltmeter, AC voltage sensor, or the like, is provided at a position at which the voltage Vr between both ends of the filter reactor 42 can be detected in the filter circuit 37. The fifth voltage sensor 55 detects each of the voltages Vlu, Vlv and Vlw between both ends of the filter reactor 42 in the filter circuit 37.

Note that the position where the fifth voltage sensor 55 is provided is not limited to the position illustrated in FIG. 7 and may be any position if the voltages Vlu, Vlv and Vlw between both ends of the filter reactor 42 can be detected. The voltages Vlu, VIv and Vlw between both ends of the filter reactor 42 detected by the fifth voltage sensor 55 are obtained by the control device 60C. Note that the fifth voltage sensor 55 may detect the voltages between both ends of the damping resistor 41 and the filter reactor 42.

Figure 8:
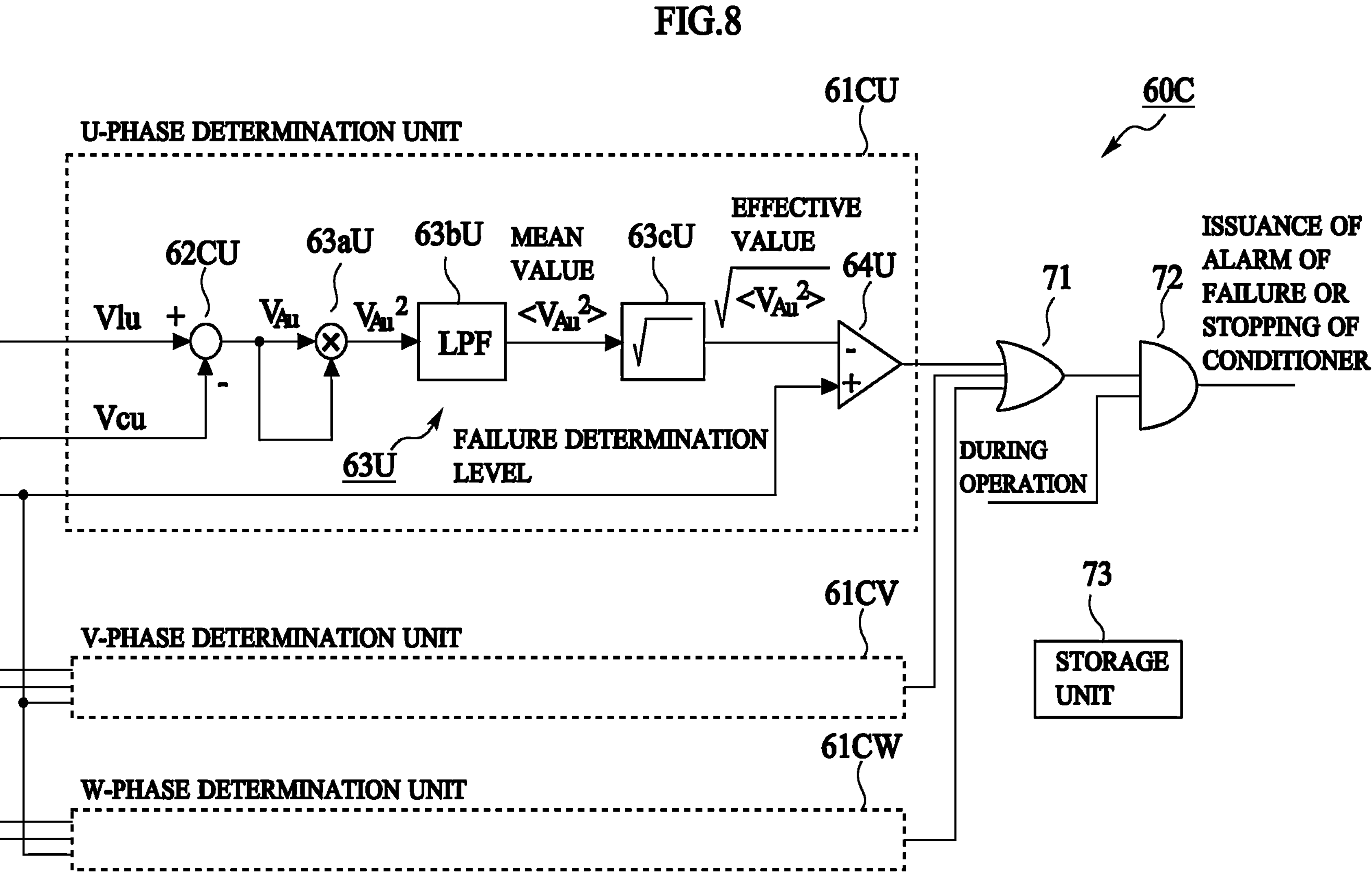
FIG. 8 is a view illustrating a control configuration example of a control device in the power conditioning system illustrated in FIG. 7.

FIG. 8 is a view illustrating a control configuration example of the control device 60C in the power conditioning system 1C illustrated in FIG. 7. While a configuration of the control device 60C illustrated in FIG. 8 is substantially similar to the configuration of the control device 60 illustrated in FIG. 2, each determination unit 61C has a component or a function of the voltage recognition unit 62C in place of the subtraction unit 62. The voltage recognition unit 62CU of the U-phase determination unit 61CU will be described below. Note that the control device 60C is an example of the "device" and may be a monitoring device (not illustrated), or the like, in a similar manner to the control device 60 illustrated in FIG. 2.

The voltage recognition unit 62CU obtains the voltage Vlu between both ends of the U-phase filter reactor 42U from the U-phase fifth voltage sensor 55U. The voltage recognition unit 62CU recognizes the circuit component voltage VAu that is a voltage value of a voltage to be generated by the circuit component in the filter circuit 37U on the basis of the obtained voltage Vlu between both ends of the filter reactor 42U.

Note that the voltage recognition unit 62CU may recognize the obtained voltage Vlu between both ends of the filter reactor 42U as the circuit component voltage VAu, for example, in a case where only the filter reactor 42U is provided as the circuit component of the filter circuit 37U. Further, for example, in a case where circuit components other than the filter reactor 42U are provided as the circuit components of the filter circuit 37U, the voltage recognition unit 62CU may perform predetermined calculation on the voltage Vlu between both ends of the filter reactor 42U and may recognize the result as the circuit component voltage VAu. The voltage recognition unit 62CU outputs the recognized circuit component voltage VAu to the effective value calculation unit 63U. Note that the voltage recognition unit 62CU is one example of the "voltage recognition unit".

In the third modification of the first embodiment illustrated in FIG. 7 and FIG. 8 described above, the voltage recognition unit 62CU recognizes the circuit component voltage VAu on the basis of the voltage Vlu between both ends of the filter reactor 42U. By this means, according to the third modification of the first embodiment illustrated in FIG. 7 and FIG. 8, it is possible to provide operational effects similar to those in the embodiment illustrated in FIG. 1 to FIG. 6.

Second Embodiment

Figure 9:
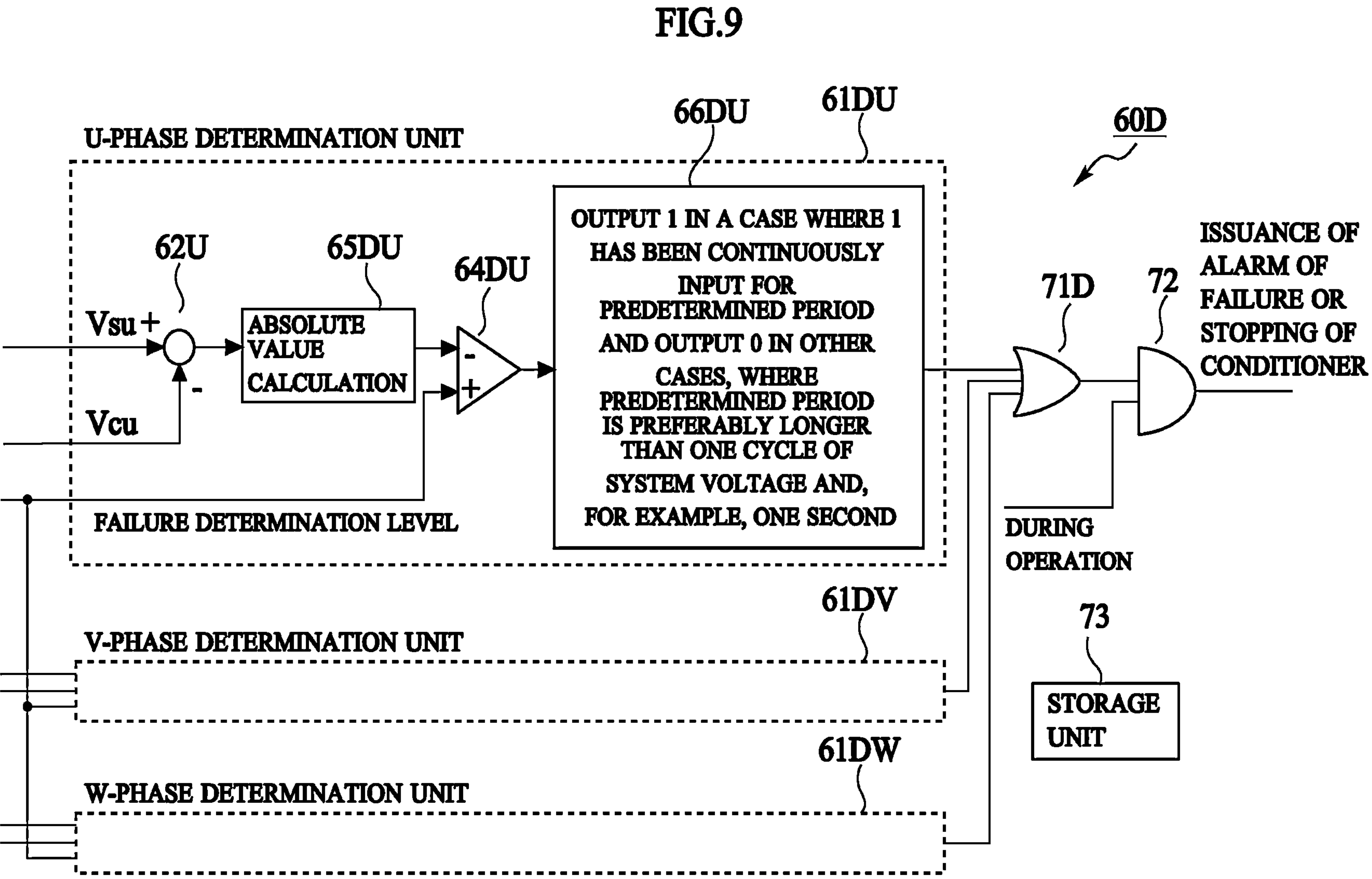
FIG. 9 is a view illustrating a control configuration example of a control device in a power conditioning system according to a second embodiment.

FIG. 9 is a view illustrating a control configuration example of a control device 60D in a power conditioning system 1D according to a second embodiment. Note that in the second embodiment, the same reference numerals will be assigned to components that are the same as or similar to the components in the embodiment illustrated in FIG. 1 to FIG. 8, and detailed description will be omitted or simplified.

Here, an overall configuration of the power conditioning system 1D (power conditioning device 30D) in the second embodiment is the same as or similar to the overall configuration of the power conditioning system 1 (power conditioning device 30) in the first embodiment illustrated in FIG. 1, and thus, illustration and description of the overall configuration will be omitted. The control configuration example of the control device 60D in the power conditioning system 1D (power conditioning device 30D) according to the second embodiment will be described below on the basis of FIG. 9.

While the control configuration of the control device 60D illustrated in FIG. 9 is substantially similar to the control configuration of the control device 60 illustrated in FIG. 2, each determination unit 61D has a component or a function of an absolute value calculation unit 65D in place of the effective value calculation unit 63. Further, each determination unit 61D has a component or a function of a second failure determination unit 66D between the failure determination unit 64 and the failure detection unit 71. Note that in accordance with this, the failure determination unit 64 and the failure detection unit 71 are replaced with a failure determination unit 64D and a failure detection unit 71D. Note that the control device 60D is one example of the "device" and may be a monitoring device (not illustrated), or the like, in a similar manner to the control device 60 illustrated in FIG. 2.

Note that in a similar manner to the first embodiment, a U-phase determination unit 61DU of the second embodiment has the same component or function as that of a V-phase determination unit 61DV and a W-phase determination unit 61DW. Thus, points different from the U-phase determination unit 61DU illustrated in FIG. 9 and the U-phase determination unit 61U illustrated in FIG. 2 will be mainly described, and description of the V-phase determination unit 61DV and the W-phase determination unit 61DW will be omitted.

The absolute value calculation unit 65DU obtains the circuit component voltage VAu from the subtraction unit 62U and performs predetermined publicly known calculation on the obtained circuit component voltage VAu to calculate an absolute value VAABSu of the circuit component voltage VAu. The absolute value calculation unit 65DU outputs the calculated absolute value VAABSu of the circuit component voltage VAu to the failure determination unit 64U. Note that the absolute value calculation unit 65DU is one example of the "voltage calculation unit", and the absolute value VAABSu of the circuit component voltage VAu is one example of a "predetermined voltage calculation value".

The failure determination unit 64DU obtains the absolute value VAABSu of the circuit component voltage VAu from the absolute value calculation unit 65DU and obtains a failure determination level Vthu of the U-phase filter capacitor 43U from the storage unit 73 via a system bus (not illustrated), or the like. The failure determination unit 64DU compares the absolute value VAABSu of the circuit component voltage VAu with the U-phase failure determination level Vthu to determine whether or not the failure determination level Vthu is greater than the absolute value VAABSu.

The failure determination unit 64DU determines that a failure occurs in the U-phase filter capacitor 43U in a case where the failure determination level Vthu is greater than the absolute value VAABSu. In this case, the failure determination unit 64DU outputs "1" indicating that a failure occurs in the U-phase filter capacitor 43U to the second failure determination unit 66DU.

On the other hand, the failure determination unit 64DU determines that a failure does not occur in the U-phase filter capacitor 43U in a case where the failure determination level Vthu is smaller than the absolute value VAABSu. In this case, the failure determination unit 64DU outputs "O" indicating that a failure does not occur in the U-phase filter capacitor 43U to the second failure determination unit 66DU. Note that other functions and operation of the failure determination unit 64DU are the same as or similar to those of the failure determination unit 64U, and thus, description will be omitted.

The second failure determination unit 66DU obtains output from the failure determination unit 64DU and determines whether or not "1" indicating that a failure occurs in the filter capacitor 43U has been continuously obtained for a predetermined period from the output of the failure determination unit 64DU. Note that the "predetermined period" described here is preferably longer than one cycle of a system voltage and, for example, one second.

The second failure determination unit 66DU determines that a failure occurs in the filter capacitor 43U in a case where it is determined from the output of the failure determination unit 64DU that "1" indicating that a failure occurs in the filter capacitor 43U has been continuously obtained for the predetermined period. In this case, the second failure determination unit 66DU outputs "1" indicating that a failure occurs in the filter capacitor 43U to the failure detection unit 71D.

On the other hand, in other cases, the second failure determination unit 66DU determines that a failure does not occur in the filter capacitor 43U. In other words, the second failure determination unit 66DU determines that a failure occurs in the filter capacitor 43U in a case where it is determined from the output of the failure determination unit 64DU that "1" indicating that a failure occurs in the filter capacitor 43U has not been continuously obtained for the predetermined period. In this case, the second failure determination unit 66DU outputs "0" indicating that a failure does not occur in the filter capacitor 43U to the failure detection unit 71D. In this case, the second failure determination unit 66DU may continuously output "0" indicating that a failure does not occur in the filter capacitor 43U to the failure detection unit 71D until it is determined from the output of the failure determination unit 64DU that "1" has been continuously obtained for the predetermined period. Alternatively, in this case, the second failure determination unit 66DU does not have to output anything in particular to the failure detection unit 71D until it is determined from the output of the failure determination unit 64DU that "1" has been continuously obtained for the predetermined period.

The failure detection unit 71D obtains output from each of the second failure determination unit 66DU, the second failure determination unit 66DV and the second failure determination unit 66DW and obtains information as to whether or not a failure occurs in the filter capacitor 43 (one of 43U, 43V and 43W). Then, the failure detection unit 71D determines whether or not "1" indicating that a failure occurs in the filter capacitor 43 (one of 43U, 43V and 43W) has been obtained from the output of one of the second failure determination units 66DU, 66DV and 66DW.

In a case where it is determined that "1" indicating that a failure occurs in the filter capacitor 43 has been obtained from one of the second failure determination units 66DU, 66DV and 66DW, the failure detection unit 71D outputs "1" indicating that a failure of the filter capacitor 43 has been detected to the operation control unit 72.

On the other hand, in a case where it is determined that "1" has not been obtained from output of any of the second failure determination units 66DU, 66DV and 66DW, the failure detection unit 71D outputs "O" indicating that a failure of the filter capacitor 43 has not been detected to the operation control unit 72. Note that other functions and operation of the failure detection unit 71D are the same as or similar to those of the failure detection unit 71, and thus, description will be omitted.

Operational effects of second embodiment>

According to the second embodiment illustrated in FIG. 9 described above, operational effects similar to those of the first embodiment illustrated in FIG. 1 and FIG. 2 are provided.

Further, according to the second embodiment illustrated in FIG. 9, the second failure determination unit 66D does not output "1" indicating that a failure occurs in the filter capacitor 43 to the failure detection unit 71D until it is determined from the output of the failure determination unit 64D that "1" has been continuously obtained for the predetermined period. By this means, according to the second embodiment illustrated in FIG. 9, it is possible to prevent fluctuation of a determination result, erroneous determination, or the like, of failure determination of the filter capacitor 43.

Note that, for example, concerning the position of the voltage sensor, components of the voltage recognition unit (subtraction unit), and the like, modifications similar to the first to the third modifications of the first embodiment illustrated in FIG. 3 to FIG. 8 can be also applied in the second embodiment illustrated in FIG. 9. Further, in a case where these modifications are applied in the second embodiment illustrated in FIG. 9, operational effects similar to those of these modifications can be provided also in the second embodiment illustrated in FIG. 9.

Third Embodiment

Figure 10:
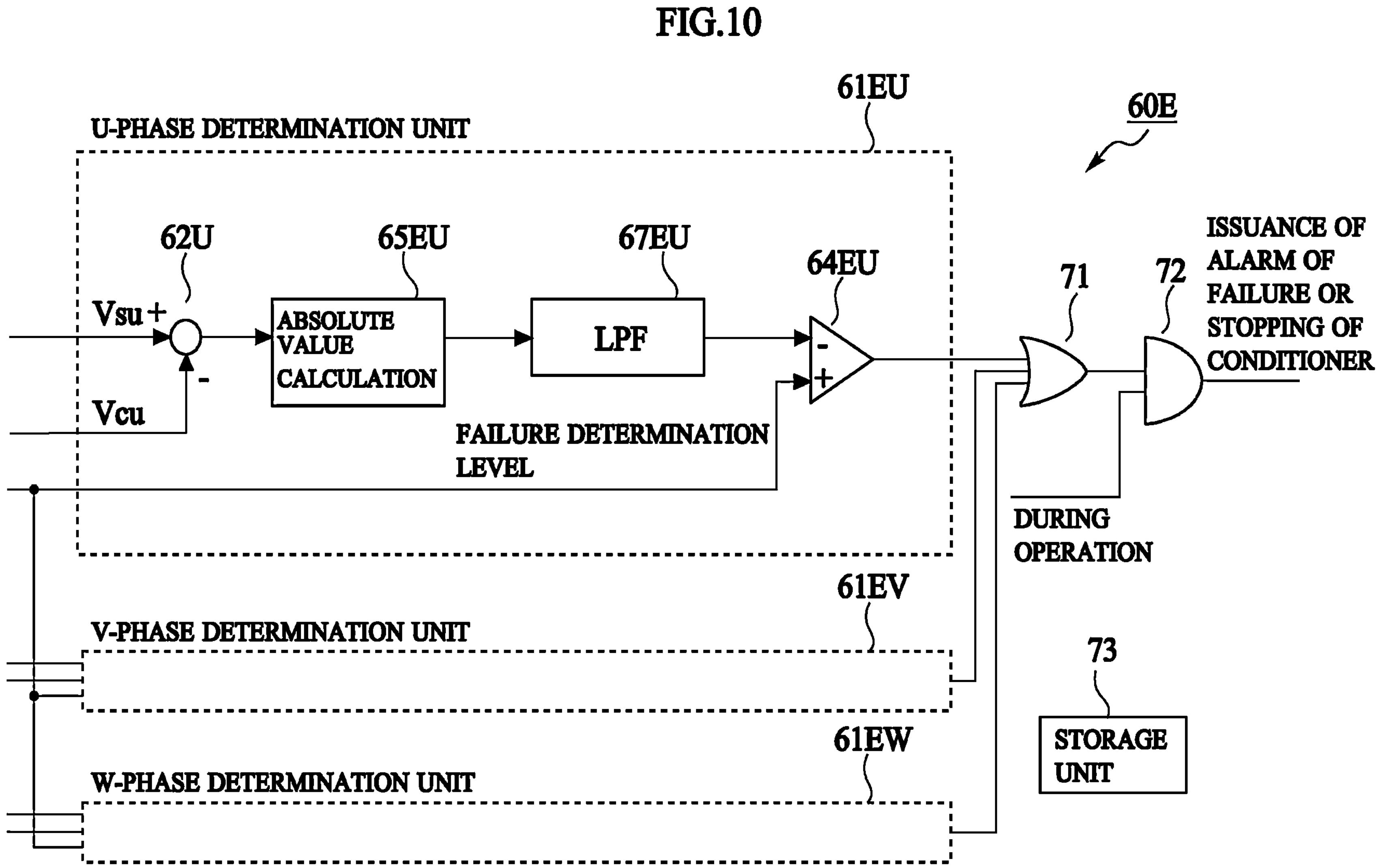
FIG. 10 is a view illustrating a control configuration example of a control device in a power conditioning system according to a third embodiment.

FIG. 10 is a view illustrating a control configuration example of a control device 60E in a power conditioning system 1E according to a third embodiment. Note that in the third embodiment, the same reference numerals will be assigned to components that are the same as or similar to the components of the embodiments illustrated in FIG. 1 to FIG. 9, and detailed description will be omitted or simplified.

Here, an overall configuration of the power conditioning system 1E (power conditioning device 30E) in the third embodiment is the same as or similar to the overall configuration of the power conditioning system 1 (power conditioning device 30) of the first embodiment illustrated in FIG. 1, and thus, illustration and description of the overall configuration will be omitted. The control configuration example of the control device 60E in the power conditioning system 1E (power conditioning device 30E) according to the third embodiment will be described below on the basis of FIG. 10.

While the control configuration of the control device 60E illustrated in FIG. 10 is substantially similar to the control configuration of the control device 60 illustrated in FIG. 2, each determination unit 61E has a component or a function of an absolute value calculation unit 65E in place of the effective value calculation unit 63. Further, each determination unit 61E has a component or a function of a low pass filter (LPF) 67E between the absolute value calculation unit 65E and the failure determination unit 64. Note that in accordance with this, the failure determination unit 64 is replaced with a failure determination unit 64E. Note that the control device 60E is one example of the "device" and may be a monitoring device (not illustrated), or the like, in a similar manner to the control device 60 illustrated in FIG. 2.

Note that in a similar manner to the first embodiment, a U-phase determination unit 61EU of the third embodiment has the same component or function as that of a V-phase determination unit 61EV, a W-phase determination unit 61EW. Thus, concerning the U-phase determination unit 61EU illustrated in FIG. 10, points different from the U-phase determination unit 61 illustrated in FIG. 2 will be mainly described, and description of the V-phase determination unit 61EV and the W-phase determination unit 61EW will be omitted.

The absolute value calculation unit 65EU obtains the circuit component voltage VAu from the subtraction unit 62U and performs predetermined publicly known calculation on the obtained circuit component voltage VAu to calculate the absolute value VAABSu of the circuit component voltage VAu in a similar manner to the absolute value calculation unit 65DU of the second embodiment. The absolute value calculation unit 65EU outputs the calculated absolute value VAABSu of the circuit component voltage VAu to the LPF 67EU. Note that the absolute value calculation unit 65EU is one example of the "voltage calculation unit", and the absolute value VAABSu of the circuit component voltage VAu is one example of the "predetermined voltage calculation value".

The low pass filter (LPF) 67EU obtains the absolute value VAABSu of the circuit component voltage VAu from the absolute value calculation unit 65EU and performs filter processing on the obtained absolute value VAABSu. As a result of the filter processing being performed by the LPF 67EU, for example, only a predetermined filter processing value VAABSfu necessary for determination is extracted from the absolute value VAABSu of the circuit component voltage VAu. The LPF 67EU outputs the extracted filter processing value VAABSfu to the failure determination unit 64EU.

The failure determination unit 64EU obtains the filter processing value VAABSfu extracted by the LPF 67EU from the LPF 67EU and obtains the failure determination level Vthu of the U-phase filter capacitor 43U from the storage unit 73 via a system bus (not illustrated), or the like. The failure determination unit 64EU compares the obtained filter processing value VAABSfu with the U-phase failure determination level Vthu to determine whether or not the failure determination level Vthu is greater than the filter processing value VAABSfu.

The failure determination unit 64EU determines that a failure occurs in the U-phase filter capacitor 43U in a case where the failure determination level Vthu is greater than the filter processing value VAABSfu. In this case, the failure determination unit 64EU outputs "1" indicating that a failure occurs in the U-phase filter capacitor 43U to the failure detection unit 71.

On the other hand, the failure determination unit 64EU determines that a failure does not occur in the U-phase filter capacitor 43U in a case where the failure determination level Vthu is smaller than the filter processing value VAABSfu. In this case, the failure determination unit 64EU outputs "0" indicating that a failure does not occur in the U-phase filter capacitor 43U to the failure detection unit 71. Note that the LPF 67EU is one example of the "voltage calculation unit", and the filter processing value VAABSfu is one example of the "predetermined voltage calculation value". Note that other functions and operation of the failure determination unit 64EU are the same as or similar to those of the failure determination unit 64U, and thus, description will be omitted.

Operational Effects of Third Embodiment

According to the third embodiment illustrated in FIG. 10, operational effects similar to those of the first embodiment illustrated in FIG. 1 and FIG. 2 are provided.

Further, according to the third embodiment illustrated in FIG. 10, as a result of the filter processing being performed by the LPF 67EU, for example, only a predetermined filter processing value VAABSfu necessary for determination is extracted from the absolute value VAABSu of the circuit component voltage VAu. Then, the failure determination unit 64EU compares the filter processing value VAABSfu subjected to the filter processing by the LPF 67EU with the U-phase failure determination level Vthu to determine whether or not a failure occurs in the filter capacitor 43. By this means, according to the third embodiment illustrated in FIG. 10, it is possible to prevent fluctuation of a determination result, erroneous determination, or the like, of failure determination of the filter capacitor 43.

Note that, for example, concerning the position of the voltage sensor, components of the voltage recognition unit (subtraction unit), and the like, modifications similar to the first to the third modifications of the first embodiment illustrated in FIG. 3 to FIG. 8 can be also applied in the third embodiment illustrated in FIG. 10. Further, in a case where these modifications are applied in the third embodiment illustrated in FIG. 10, operational effects similar to those of these modifications can be provided also in the third embodiment illustrated in FIG. 10.

Fourth Embodiment

FIG. 11 is a view illustrating a control configuration example of a control device 60F in a power conditioning system 1F in a fourth embodiment. Note that in the fourth embodiment, the same reference numerals will be assigned to components that are the same as or similar to the components of the embodiments illustrated in FIG. 1 to FIG. 10, and detailed description will be omitted or simplified.

Here, an overall configuration of the power conditioning system 1F (power conditioning device 30F) in the fourth embodiment is the same as or similar to the overall configuration of the power conditioning system 1 (power conditioning device 30) of the first embodiment illustrated in FIG. 1, and thus, illustration and description of the overall configuration will be omitted. The control configuration example of the control device 60F in the power conditioning system 1F (power conditioning device 30F) according to the fourth embodiment will be described below on the basis of FIG. 11.

While the control configuration of the control device 60F illustrated in FIG. 11 is substantially similar to the control configuration of the control device 60 illustrated in FIG. 2, the U-phase determination unit 61U, the V-phase determination unit 61V and the W-phase determination unit 61W are replaced with a d-axis determination unit 61Fd and a q-axis determination unit 61Fq. Further, the control device 60F has a component or function of a three-phase-to-two-phase transformation unit 74F. Note that the control device 60F is one example of the "device" and may be a monitoring device (not illustrated), or the like, in a similar manner to the control device 60 illustrated in FIG. 2.

The three-phase-to-two-phase transformation unit (dq transformation unit) 74F is connected to the three-phase first voltage sensors 51U, 51V and 51W via a signal line (not illustrated), or the like. The three-phase-to-two-phase transformation unit 74F obtains three-phase capacitor voltages Vcu, Vcv and Vcw from the three-phase first voltage sensors 51U, 51V and 51W. Then, the three-phase-to-two-phase transformation unit 74F performs three-phase to two-phase transformation (dq transformation) on the obtained capacitor voltages Vcu, Vcv and Vcw to obtain a d-axis capacitor voltage Vcd and a q-axis capacitor voltage Vcq.

Note that three-phase to two phase transformation (dq transformation) only requires to be performed using a publicly known method. For example, the three-phase-to-two-phase transformation unit 74F dq-transforms the capacitor voltage Vc at a phase angle θ that is in synchronization with a frequency of the system voltage Vs to calculate the d-axis capacitor voltage Ved and the q-axis capacitor voltage Vcq on a dq coordinate. Then, the three-phase-to-two-phase transformation unit 74F outputs the obtained d-axis capacitor voltage Vcd to the d-axis determination unit 61Fd and outputs the obtained q-axis capacitor voltage Vcq to the q-axis determination unit 61Fq.

Further, the three-phase-to-two-phase transformation unit 74F is also connected to three-phase second voltage sensors 52U, 52V and 52W via a signal line (not illustrated), or the like. The three-phase-to-two-phase transformation unit 74F obtains three-phase system voltages Vsu, Vsv and Vsw from the three-phase second voltage sensors 52U, 52V and 52W. Then, the three-phase-to-two-phase transformation unit 74F performs three-phase to two-phase transformation (dq transformation) on the obtained system voltages Vsu, Vsv and Vsw to obtain a d-axis system voltage Vsd and a q-axis system voltage Vsq.

Note that the three-phase to two-phase transformation (dq transformation) only requires to be performed using a publicly known method. For example, the three-phase-to-two-phase transformation unit 74F dq-transforms the system voltage Vs at a phase angle θ that is in synchronization with a frequency of the system voltage Vs to calculate the d-axis system voltage Vsd and the q-axis system voltage Vsq on the dq coordinate. Then, the three-phase-to-two-phase transformation unit 74F outputs the obtained d-axis system voltage Vsd to the d-axis determination unit 61Fd and outputs the obtained q-axis system voltage Vsq to the q-axis determination unit 61Fq.

The d-axis determination unit 61Fd has components or functions of a subtraction unit 62Fd, an effective value calculation unit 63Fd and a failure determination unit 64Fd.

The subtraction unit 62Fd obtains the d-axis system voltage Vsd and the d-axis capacitor voltage Ved from the three-phase-to-two-phase transformation unit 74F via a system bus (not illustrated), or the like. The subtraction unit 62Fd subtracts the obtained d-axis capacitor voltage Ved from the obtained d-axis system voltage Vsd to calculate a differential voltage between the d-axis system voltage Vsd and the d-axis capacitor voltage Vcd.

The differential voltage that is a difference between the d-axis system voltage Vsd and the d-axis capacitor voltage Ved is a d-axis voltage of a voltage to be generated by the circuit component that is at least one of the damping resistor 41U or the filter reactor 42U in the U-phase filter circuit 37U. Thus, the subtraction unit 62Fd recognizes the circuit component voltage VAd that is a d-axis voltage value of a voltage to be generated by the circuit component in the filter circuit 37U by obtaining the differential voltage between the d-axis system voltage Vsd and the d-axis capacitor voltage Vcd. The subtraction unit 62Fd outputs the recognized circuit component voltage VAd to the effective value calculation unit 63Fd. Note that the subtraction unit 62Fd is one example of the "voltage recognition unit".

The effective value calculation unit 63Fd obtains the circuit component voltage VAd from the subtraction unit 62Fd and performs predetermined calculation on the obtained circuit component voltage VAd to calculate an effective value VARMSd of the circuit component voltage VAd. The effective value calculation unit 63Fd outputs the calculated effective value VARMSd of the circuit component voltage VAd to the failure determination unit 64Fd. Note that the effective value calculation unit 63Fd is one example of the "voltage calculation unit", and the effective value VARMSd of the circuit component voltage VAd is one example of the "predetermined voltage calculation value".

The effective value calculation unit 63Fd has components and functions of a multiplication unit 63Fad, a low pass filter (LPF) 63Fbd and a square root calculation unit 63Fcd. Note that the functions and operation of the multiplication unit 63Fad, the LPF 63Fbd and the square root calculation unit 63Fcd in the fourth embodiment are the same as or similar to the multiplication unit 63*a*U, the LPF 63*b*U and the square root calculation unit 63*c*U in the first embodiment, and thus, description will be omitted.

The failure determination unit 64Fd obtains the effective value VARMSd of the circuit component voltage VAd from the effective value calculation unit 63Fd (square root calculation unit 63Fcd) and obtains a failure determination level Vthd of the U-phase filter capacitor 43U from the storage unit 73 via a system bus (not illustrated), or the like. The failure determination unit 64Fd compares the effective value VARMSd of the circuit component voltage VAd with the d-axis failure determination level Vthd to determine whether or not the failure determination level Vthd is greater than the effective value VARMSd.

The failure determination unit 64Fd determines that a failure occurs in the filter capacitor 43 in one of the three phases in a case where the failure determination level Vthd is greater than the effective value VARMSd. In this case, the failure determination unit 64Fd outputs "1" indicating that a failure occurs in the filter capacitor 43 to the failure detection unit 71.

On the other hand, the failure determination unit 64Fd determines that a failure does not occur in the filter capacitor 43U in any of the three phases in a case where the failure determination level Vthd is smaller than the effective value VARMSd. In this case, the failure determination unit 64Fd outputs "0" indicating that a failure does not occur in the filter capacitor 43U to the failure detection unit 71. Note that other functions and operation of the failure determination unit 64Fd is the same as or similar to those of the failure determination unit 64, and thus, description will be omitted.

Note that the d-axis determination unit 61Fd and the q-axis determination unit 61Fq of the fourth embodiment have the same components or functions, and thus, description of the q-axis determination unit 61Fq will be omitted.

The failure detection unit 71F obtains output from each of the failure determination unit 64Fd and the failure determination unit 64Fq and obtains information as to whether or not a failure occurs in the filter capacitor 43 (one of 43U, 43V and 43W). Then, the failure detection unit 71F determines whether or not "1" indicating that a failure occurs in the filter capacitor 43 (one of 43U, 43V and 43W) from output of one of the failure determination unit 64Fd and the failure determination unit 64Fq.

The failure detection unit 71F outputs “1” indicating that a failure of the filter capacitor 43 has been detected to the operation control unit 72 in a case where it is determined that “1” indicating that a failure occurs in the filter capacitor 43 has been obtained from output of one of the failure determination units 64Fd and 64Fq.

On the other hand, the failure detection unit 71F outputs “0” indicating that a failure of the filter capacitor 43 has not been detected to the operation control unit 72 in a case where “1” has not been obtained from output of any of the failure determination units 64Fd and 64Fq. Note that other functions and operation of the failure detection unit 71F are the same as or similar to those of the failure detection unit 71, and thus, description will be omitted.

Note that the failure determination unit 64Fd, the failure determination unit 64Fq and the failure detection unit 71F are one example of the “failure determination unit”.

Operational Effects of Fourth Embodiment

According to the fourth embodiment illustrated in FIG. 11 described above, operational effects similar to those of the first embodiment illustrated in FIG. 1 and FIG. 2 are provided.

Further, according to the fourth embodiment illustrated in FIG. 11, a failure of the filter capacitor 43 can be detected not on the basis of a coordinate system at rest but on the basis of a dq coordinate system.

Note that, for example, concerning the position of the voltage sensor, components of the voltage recognition unit (subtraction unit), or the like, modifications similar to the first to the third modifications of the first embodiment illustrated in FIG. 3 to FIG. 8 can be also applied in the fourth embodiment illustrated in FIG. 11. Further, in a case where these modifications are applied in the fourth embodiment illustrated in FIG. 11, operational effects similar to those of these modifications can be provided also in the fourth embodiment illustrated in FIG. 11.

Hardware Configuration Example

Figure 12:
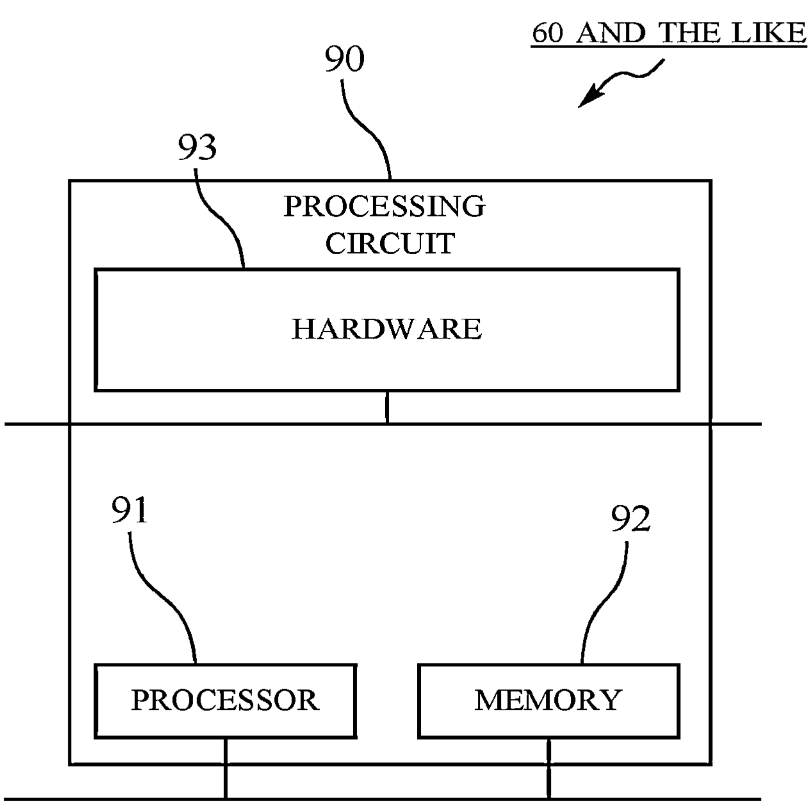
FIG. 12 is a conceptual diagram illustrating a hardware configuration example of a processing circuit provided in the control device in the embodiments illustrated in FIG. 1 to FIG. 11.

FIG. 12 is a conceptual diagram illustrating a hardware configuration example of a processing circuit 90 of the control devices 60, 60A, 60B, 60C, 60D, 60E and 60F (hereinafter, referred to as a “control device 60, and the like”) in the embodiments illustrated in FIG. 1 to FIG. 11. The above-described respective functions are implemented by the processing circuit 90. As one aspect, the processing circuit 90 includes at least one processor 91 and at least one memory 92. As another aspect, the processing circuit 90 includes at least one dedicated hardware 93.

In a case where the processing circuit 90 includes the processor 91 and the memory 92, the respective functions are implemented by software, firmware or a combination of the software and the firmware. At least one of the software or the firmware is described as a program. At least one of the software or the firmware is stored in the memory 92. The processor 91 implements the respective functions by reading out and executing the program stored in the memory 92.

In a case where the processing circuit 90 includes the dedicated hardware 93, the processing circuit 90 is, for example, a single circuit, a composite circuit, a programmed processor or a combination thereof. The respective functions are implemented by the processing circuit 90.

Some or all of the respective functions of the control device 60, and the like, may be constituted as hardware or may be constituted as a program to be executed by the processor. In other words, the control device 60, and the like, can be implemented by a computer and a program, and the program can be stored in a storage medium or can be provided through a network.

Supplementary Note of Embodiments

According to the embodiments described in FIG. 1 to FIG. 12 described above, the present invention includes the first embodiment and modifications thereof illustrated in FIG. 1 to FIG. 8, the second embodiment illustrated in FIG. 9, the third embodiment illustrated in FIG. 10 and the fourth embodiment illustrated in FIG. 11, the present invention is not limited to this. A plurality of these embodiments may be combined in series or in parallel. The combined embodiments can provide operational effects similar to the respective operational effects provided by the respective embodiments before being combined.

Note that combinations of the respective configurations of the present disclosure are not limited to the combinations indicated in the embodiments illustrated in FIG. 1 to FIG. 11.

FIG. 13 is a view illustrating examples of combinations of the respective configurations of the present disclosure. The combinations of the respective configurations of the present disclosure are not limited to the combinations indicated in the embodiments illustrated in FIG. 1 to FIG. 11 and may be any combination of the respective configurations illustrated in FIG. 13.

For example, concerning a subject that detects a failure and operation after a failure is detected, the control device may perform one of issuance of an alarm of a failure or stopping of the power conditioning device, or the monitoring device may issue an alarm of a failure.

Further, voltages for detecting a failure may be the capacitor voltage and a voltage measured on the system side of the AC switch or may be the capacitor voltage and a voltage measured on the inverter side of the AC switch. Further, the voltages for detecting a failure may be obtained by measuring the voltage between both ends of the damping resistor or the voltage between both ends of the filter reactor.

Further, the number of phases of AC output of the power conditioning device may be a single phase or three phases.

Further, the voltage (voltage calculation value) to be compared with the predetermined threshold may be a raw voltage value, a value of a voltage to which a low pass filter is applied, the effective value or a value of an amplitude of a fundamental wave component.

Further, a coordinate system in which the voltage (voltage calculation value) to be compared with the predetermined threshold is calculated may be a coordinate system at rest or a dq coordinate system.

Further, a coordinate system in which comparison with the predetermined threshold is performed may be a coordinate system at rest or a dq coordinate system. Further, either a power system or a load may be connected to the AC side of the power conditioning device.

As described above, any combination of the respective configurations illustrated in FIG. 13 can provide operational effects similar to the respective operational effects provided by the embodiments illustrated in FIG. 1 to FIG. 11.

Note that according to the embodiments illustrated in FIG. 1 to FIG. 12, while the power conditioning systems 1 to 1F (power conditioning devices 30 to 30F) and the control devices 60 to 60F provided in the power conditioning systems 1 to 1F have been described as an example, as one aspect of the present disclosure, the present disclosure is not limited to this. The present disclosure can be also implemented as a method for detecting a failure of the filter capacitor 43, in which processing steps at the respective units of the control device 60, and the like, are performed.

Further, the present disclosure can be also implemented as a failure detection program of the filter capacitor 43, for causing a computer to execute processing steps at the respective units of the control device 60, and the like.

Further, the present disclosure can be also implemented as a storage medium (non-transitory computer-readable storage medium) in which the failure detection program of the filter capacitor 43 is stored. The failure detection program of the filter capacitor 43 can be distributed by being stored in a removable medium, or the like, such as, for example, a compact disc (CD), a digital versatile disc (DVD) and a universal serial bus (USB) memory. Note that the failure detection program of the filter capacitor 43 may be uploaded on a network via a network interface (not illustrated), or the like, of the control device 60, or the like, and may be downloaded from the network and stored in the storage unit 73, or the like.

Characteristics and advantages of the embodiments would be clear from the detailed description described above. It is intended that the claims cover the characteristics and advantages of the embodiments as described above within a range not deviating from the spirit and scope of rights. Further, a person having normal knowledge in this technical field could have easily conceived of any modifications and changes. Thus, the scope of the embodiments having inventiveness are not intended to be limited to the range described above and can include appropriate modifications and equivalents included in the range disclosed in the embodiments.

REFERENCE SIGNS LIST

1, 1A, 1B, 1C, 1D, 1E, 1F . . . Power conditioning system (PCS); 10 . . . Photovoltaics (PV); 20 . . . AC power system (system, load); 30, 30A, 30B, 30C, 30D, 30E, 30F . . . Power conditioning device (power conditioner); 31 . . . DC bus; 32 . . . DC capacitor (DC capacitor); 33 . . . Inverter circuit (inverter); 34 . . . AC circuit; 34*a* . . . Branch point; 35 . . . AC reactor (AC reactor); 36 . . . AC switch (AC switch); 37, 37U, 37V, 37W . . . Filter circuit; 41, 41U, 41V, 41W . . . Damping resistor; 42, 42U, 42V, 42W . . . Filter reactor; 43, 43U, 43V, 43W . . . Filter capacitor; 51, 51U, 51V, 51W . . . First voltage sensor; 52, 52U, 52V, 52W . . . Second voltage sensor; 53, 53U, 53V, 53W . . . Third voltage sensor; 54, 54U, 54V, 54W . . . Fourth voltage sensor; 55, 55U, 55V, 55W . . . Fifth voltage sensor; 60, 60A, 60B, 60C, 60D, 60E, 60F . . . Control device (monitoring device, device, controller); 61, 61A, 61B, 61C, 61D, 61E, 61F . . . Determination unit; 61U, 61AU, 61BU, 61CU, 61DU, 61EU . . . U-phase determination unit; 61V, 61AV, 61BV, 61CV, 61DV, 61EV . . . V-phase determination unit; 61W, 61AW, 61BW, 61CW, 61DW, 61EW . . . W-phase determination unit; 61Fd . . . d-axis determination unit; 61Fq . . . q-axis determination unit; 62, 62U, 62V, 62W . . . Subtraction unit (voltage recognition unit); 62A, 62AU, 62AV, 62AW . . . Subtraction unit (voltage recognition unit); 62B, 62BU, 62BV, 62BW . . . Voltage recognition unit; 62C, 62CU, 62CV, 62CW . . . Voltage recognition unit; 62F, 62Fd, 62Fq . . . Subtraction unit (voltage recognition unit); 63, 63U, 63V, 63W . . . Effective value calculation unit (voltage calculation unit); 63F, 63Fd, 63Fq . . . Effective value calculation unit (voltage calculation unit); 63*a*, 63*a*U, 63*a*V, 63*a*W . . . Multiplication unit; 63*b*, 63*b*U, 63*b*V, 63*b*W . . . Low pass filter (LPF); 63*c*, 63*c*U, 63*c*V, 63*c*W . . . Square root calculation unit; 63Fa, 63Fad, 63Faq . . . Multiplication unit; 63Fb, 63Fbd, 63Fbq . . . Low pass filter (LPF); 63Fc, 63Fcd, 63Fcq . . . Root square calculation unit; 64, 64U, 64V, 64W . . . Failure determination unit; 64D, 64DU, 64DV, 64DW . . . Failure determination unit; 64E, 64EU, 64EV, 64EW . . . Failure determination unit; 64F, 64Fd, 64Fq . . . Failure determination unit; 65D, 65DU, 65DV, 65DW . . . Absolute value calculation unit (voltage calculation unit); 65E, 65EU, 65EV, 65EW . . . Absolute value calculation unit (voltage calculation unit); 66D, 66DU, 66DV, 66DW . . . Second failure determination unit (failure determination unit); 71, 71D, 71F . . . Failure detection unit (failure determination unit); 72 . . . Operation control unit; 73 . . . Storage unit; 74F . . . Three-phase-to-two-phase transformation unit (dq transformation unit); 90 . . . Processing circuit; 91 . . . Processor; 92 . . . Memory; 93 . . . Hardware; VA, VAu, VAv, VAw, VAd, VAq . . . Circuit component voltage; VAABSf, VAABSfu, VAABSfv, VAABSfw . . . Filter processing value (predetermined voltage calculation value); VAABS, VAABSu, VAABSv, VAABSw . . . Absolute value (predetermined voltage calculation value); VARMS, VARMSu, VARMSv, VARMSw, VARMSd, VARMSq . . . Effective value (predetermined voltage calculation value); Vc, Vcu, Vcv, Vcw . . . Capacitor voltage; Vcd . . . d-axis capacitor voltage; Vcq . . . q-axis capacitor voltage; Vl, Vlu, Vlv, Vlw . . . Voltage between both ends; Vr, Vru, Vrv, Vrw . . . Voltage between both ends; Vs, Vsu, Vsv, Vsw . . . System voltage; Vsd . . . d-axis system voltage; Vsq . . . q-axis system voltage; Vs2, Vs2*u*, Vs2*v*, Vs2*w* . . . Inverter voltage; Vth, Vthu, Vthv, Vthw, Vthd, Vthq . . . Failure determination level (predetermined threshold); θ . . . Phase angle

The invention claimed is:

1. A power conditioning system comprising:

a power conditioner including
 an inverter that converts power to output AC power, and
 filter circuitry provided on an AC output side of the inverter and including a circuit component and an AC capacitor connected in series with the circuit component, the circuit component having at least one of a damping resistor and a filter reactor, and the AC capacitor being separated from the circuit component at a time of failure; and a controller including
 voltage recognition circuitry configured to recognize a voltage value of a voltage to be generated by the circuit component,
 voltage calculation circuitry configured to calculate a voltage calculation value on a basis of the voltage value recognized by the voltage recognition circuitry,
 failure determination circuitry configured to compare the voltage calculation value calculated by the voltage calculation circuitry with a predetermined threshold and determines that a failure occurs in the AC capacitor in a case where the voltage calculation value is smaller than the predetermined threshold, and
 operation control circuitry configured to stop the power conditioner in a case where the failure determination circuitry determines that a failure occurs in the AC capacitor during operation of the power conditioner.

2. A power conditioning system comprising:

a power conditioner including:
 an inverter that converts power to output AC power, and filter circuitry provided on an AC output side of the inverter and including a circuit component and an AC capacitor connected in series with the circuit component, the circuit component having at least one of a damping resistor and a filter reactor, and the AC capacitor being to be separated from the circuit component at a time of failure, and a controller including:

voltage recognition circuitry configured to recognize a voltage value of a voltage to be generated by the circuit component, voltage calculation circuitry configured to calculate a voltage calculation value on a basis of the voltage value recognized by the voltage recognition circuitry, failure determination circuitry configured to compare the voltage calculation value calculated by the voltage calculation circuitry with a predetermined threshold and determines that a failure occurs in the AC capacitor in a case where the voltage calculation value is smaller than the predetermined threshold, and alarm issuance circuitry configured to issue an alarm indicating that a failure occurs in the AC capacitor in a case where the failure determination circuitry determines that a failure occurs in the AC capacitor during operation of the power conditioner.

3. The power conditioning system according to claim 1, wherein the voltage recognition circuitry is configured to recognize the voltage value by obtaining a voltage value of the AC capacitor and a voltage value on a system side of an AC switch provided on the AC output side and calculating a difference between the voltage value of the AC capacitor and the voltage value on the system side of the AC switch.

4. The power conditioning system according to claim 1, wherein the voltage recognition circuitry configured to recognize the voltage value by obtaining a voltage value of the AC capacitor and a voltage value on the inverter side of an AC switch provided on the AC output side and calculating a difference between the voltage value of the AC capacitor and the voltage value on the inverter side of the AC switch.

5. The power conditioning system according to claim 1, wherein the circuit component includes at least the damping resistor, and the voltage recognition circuitry is configured to recognize the voltage value by obtaining a voltage between both ends of the damping resistor.

6. The power conditioning system according to claim 1, wherein the circuit component includes at least the filter reactor, and the voltage recognition circuitry is configured to recognize the voltage value by obtaining a voltage between both ends of the filter reactor.

7. The power conditioning system according to claim 2, wherein the voltage recognition circuitry is configured to recognize the voltage value by obtaining a voltage value of the AC capacitor and a voltage value on a system side of an AC switch provided on the AC output side and calculating a difference between the voltage value of the AC capacitor and the voltage value on the system side of the AC switch.

8. The power conditioning system according to claim 2, wherein the voltage recognition circuitry is configured to recognize the voltage value by obtaining a voltage value of the AC capacitor and a voltage value on the inverter side of an AC switch provided on the AC output side and calculating a difference between the voltage value of the AC capacitor and the voltage value on the inverter side of the AC switch.

9. The power conditioning system according to claim 2, wherein the circuit component includes at least the damping resistor, and the voltage recognition circuitry is configured to recognize the voltage value by obtaining a voltage between both ends of the damping resistor.

10. The power conditioning system according to claim 2, wherein the circuit component includes at least the filter reactor, and the voltage recognition circuitry is configured to recognize the voltage value by obtaining a voltage between both ends of the filter reactor.

* * * * *